(12) United States Patent
Makovsky

(10) Patent No.: US 11,044,143 B2
(45) Date of Patent: Jun. 22, 2021

(54) SYSTEM FOR PROCESSING EVENTS USING EVENT RULES

(71) Applicant: ServiceNow, Inc., Santa Clara, CA (US)

(72) Inventor: Bnayahu Makovsky, Savyon (IL)

(73) Assignee: ServiceNow, Inc., Santa Clara, CA (US)

( * ) Notice: Subject to any disclaimer, the term of this patent is extended or adjusted under 35 U.S.C. 154(b) by 244 days.

(21) Appl. No.: 15/489,235

(22) Filed: Apr. 17, 2017

(65) Prior Publication Data

US 2018/0302272 A1    Oct. 18, 2018

(51) Int. Cl.
*H04L 12/24* (2006.01)
*H04L 29/08* (2006.01)

(52) U.S. Cl.
CPC ...... *H04L 41/0686* (2013.01); *H04L 41/0681* (2013.01); *H04L 41/22* (2013.01); *H04L 67/1004* (2013.01)

(58) Field of Classification Search
CPC ...... H04L 41/0686; H04L 41/22; H04L 67/42
USPC ........................................ 709/224
See application file for complete search history.

(56) References Cited

U.S. PATENT DOCUMENTS

| | | | |
|---|---|---|---|
| 5,978,594 A | 11/1999 | Bonnell | |
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,392,300 B2 | 6/2008 | Anantharangachar | |
| 7,610,512 B2 | 10/2009 | Gerber | |
| 7,617,073 B2 | 11/2009 | Trinon | |

(Continued)

OTHER PUBLICATIONS

Servicenow, Product Documentation, Geneva, IT Operations Management, "Alert Binding to CIs With Event Rules", Date Unknown, Downloaded Mar. 6, 2017, hps://docs.servicenow.com/bundle/geneva-it-operations-management/page/product/event_management/reference/r_EMHowAlertsBindCI.htmltt, 5 pp.

(Continued)

*Primary Examiner* — Esther B. Henderson
*Assistant Examiner* — Nazia Naoreen
(74) *Attorney, Agent, or Firm* — Fletcher Yoder PC

(57) ABSTRACT

Events received from event sources are processed with respect to components of a computer network. Responsive to receiving an event, it is determined that the event is associated with an event rule based on criteria of the event rule. An alert is generated responsive to the event meeting an alert threshold of the event rule. The alert is then bound to a configuration item identified using at least one configuration item type and at least one configuration item attribute included in the event rule. The alert is enriched by adding one or more attributes of the configuration item to the alert according to enrichment criteria included in the event rule. The event rule is built using sequentially receiving user input. The event rule can be tested by applying the event rule to a plurality of test events. The event rule can be published for use in generating alerts.

20 Claims, 17 Drawing Sheets

(56) References Cited

U.S. PATENT DOCUMENTS

| | | | |
|---|---|---|---|
| 7,685,167 B2 | 3/2010 | Mueller | |
| 7,689,628 B2 | 3/2010 | Garg | |
| 7,783,744 B2 | 8/2010 | Garg | |
| 7,977,783 B1 | 1/2011 | Cline | |
| 7,890,802 B2 | 2/2011 | Gerber | |
| 7,930,396 B2 | 4/2011 | Trinon | |
| 7,941,506 B2 | 5/2011 | Bonal | |
| 7,945,860 B2 | 5/2011 | Vambenepe | |
| 7,966,398 B2 | 6/2011 | Wiles | |
| 8,041,799 B1* | 10/2011 | Usery | H04Q 3/0075 709/223 |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Navarrete | |
| 8,346,752 B2 | 1/2013 | Sirota | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,887,133 B2 | 11/2014 | Behnia | |
| 8,907,988 B2 | 12/2014 | Poston | |
| 9,015,188 B2 | 4/2015 | Behne | |
| 9,037,536 B2 | 5/2015 | Vos | |
| 9,137,115 B2 | 9/2015 | Mayfield | |
| 9,239,857 B2 | 1/2016 | Trinon | |
| 9,261,372 B2 | 2/2016 | Cline | |
| 9,323,801 B2 | 4/2016 | Morozov | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinelli | |
| 10,002,203 B2 | 6/2018 | George | |
| 10,505,825 B1* | 12/2019 | Bettaiah | G06F 16/22 |
| 10,547,498 B1* | 1/2020 | Garner, IV | H04L 67/303 |
| 2018/0287856 A1* | 10/2018 | Whitner | H04L 67/10 |
| 2018/0300041 A1* | 10/2018 | Tilikin | G06F 11/3433 |

OTHER PUBLICATIONS

Servicenow, Product Documentation, Geneva, IT Operations Management, "Set a Threshold Based on Event Volume", Date Unknown, Downloaded Mar. 6, 2017, https://docs.servicenow.com/bundle/geneva-it-operations-management/page/product/event_management/task/t_EMISetThresholdEvent.html, 4 pp.

Servicenow, Product Documentation, Geneva, IT Operations Management, "Create an Event Rule in Advanced View", Date Unknown, Downloaded Mar. 6, 2017, https://docs.servicenow.com/bundle/geneva-it-operations-management/page/product/event_management/task/t_EMCreateAdvancedRule.html, 6 pp.

* cited by examiner

| Event Rule Info | Event Filters | Compose Alert Output | Threshold | Binding | Enrichment |

Enrichment

Compose alert fields by adding free text and by dragging variables from the right pane.
Create new regex expressions using the marker selection.

☑ Active Enrichment — 1402

| Description | S(description) | | CI Info |
|---|---|---|---|
| | | | 🔍 Search — 1422 |
| | | 1404 | v-rhl-5-mysql1 — 1424 |
| Message Key | S(node, S(type) S(ip_address) | 1406 | (config_directory) BizTalk.root |
| Additional Information | (Fixed) (Priority) (MetricValue) | 1408 | (pid)  pid value |
| Node | S(node) | 1410 | (running_process) |
| Type | S(type) | 1412 | (edition) |
| Resource | S(resource) | 1414 | (used_for) Server |
| Metric Name | S(metric_name) | 1416 | (ip_address) 115.125.108.0 |
| Severity ⟨+⟩ | S(severity) | 1418 | (Name) |
| | | | (Serial_number) |
| | | | (Serial_number_ty0pe) |

All of these conditions must be met to ignore this event.
1420

[Add criteria] ▽ [Add value] ⊞ ⊖ [OR] [AND]

| Test Rule | | | | | | | ✕ |
|---|---|---|---|---|---|---|---|
| | ≡ Time of event | ≡ Source | ≡ Description | ≡ Node | ≡ Type | ≡ Resource | ≡ Message Key |
| ☐ | ⊙ 2016-08-26 00:49:19 | Hyperic | Available Megabytes of Memory is too low... | V-W2K8-VCENTRE.LOCAL.LAB | Available Megabytes of Memory is too low... | V-W2K8-VCENTRE.LOCAL.LAB | 290ee72d-9ee7-4f2b-ace1-af6184z46f5f |
| ☐ | ⊙ 2016-08-26 00:50:39 | Hyperic | MSSQL 2014: Workflow failed to connect... | V-W2K12-CRM.LOCAL.LAB | MSSQL 2014: Workflow failed to connect t... | MSSQLSERVER | 0a0fce31-4cda-4c3d-a07e-7169eec5a93e |
| ☐ | ⊙ 2016-08-26 00:50:39 | Hyperic | MSSQL 2014: Workflow failed to connect... | V-W2K12-CRM.LOCAL.LAB | MSSQL 2014: Workflow failed to connect t... | MSSQLSERVER | 0a0fce31-4cda-4c3d-a07e-7169eec5a93e |
| ☐ | ⊙ 2016-08-26 00:59:20 | Hyperic | Available Megabytes of Memory is too low... | V-W2K8-Maria-MID.LOCAL.LAB | Available Megabytes of Memory is too low... | V-W2K8-Maria-MID.LOCAL.LAB | 2d61d456-1478-4069-8877-84aa5c78b26c |
| ☐ | ⊙ 2016-08-26 00:59:20 | Hyperic | Available Megabytes of Memory is too low... | V-W2K8-Maria-MID.LOCAL.LAB | Available Megabytes of Memory is too low... | V-W2K8-Maria-MID.LOCAL.LAB | 2d61d456-1478-4069-8877-84aa5c78b26c |
| ☐ | ⊙ 2016-08-26 01:05:39 | Hyperic | MSSQL 2014: Workflow failed to connect... | V-W2K12-CRM.LOCAL.LAB | MSSQL 2014: Workflow failed to connect... | MSSQLSERVER | 0a0fce31-4cda-4c3d-a07e-7169eec5a93e |
| ☐ | ⊙ 2016-08-26 01:05:39 | Hyperic | MSSQL 2014: Workflow failed to connect... | V-W2K12-CRM.LOCAL.LAB | MSSQL 2014: Workflow failed to connect... | MSSQLSERVER | 0a0fce31-4cda-4c3d-a07e-7169eec5a93e |
| ☐ | ⊙ 2016-08-26 01:11:15 | Hyperic | UNIX/Linux Run As profile association er... | V-W2K8-Scom2012.LOCAL.LAB | UNIX/Linux Run As profile association er... | V-W2K8-Scom2012.LOCAL.LAB | 88478697-afaa-4305-9267-4ee350e8668e |
| ☐ | ⊙ 2016-08-26 01:11:15 | Hyperic | UNIX/Linux Run As profile association er... | V-W2K8-Scom2012.LOCAL.LAB | UNIX/Linux Run As profile association er... | V-W2K8-Scom2012.LOCAL.LAB | 88478697-afaa-4305-9267-4ee350e8668e |

⬇⬇ ⬇ to 20 of 2087 ⬆ ⬆⬆

Cancel    Next

FIG. 15

SYSTEM FOR PROCESSING EVENTS USING EVENT RULES

BACKGROUND

An electronic computing and communications system can process information using software executing on servers at a datacenter. The software can include functionality for managing the status or configuration of hardware or software components of a computer network. For example, the software can notify an administrator or like user of the computer network upon the occurrence of events associated with those hardware or software components.

SUMMARY

Disclosed herein are implementations of systems and techniques for processing events using event rules.

In an implementation, a system is provided for processing events. The system comprises a memory and a processor. The memory includes instructions executable by the processor to receive an event from an event source. The memory further includes instructions executable by the processor to determine that the event is associated with an event rule based on criteria of the event rule. The memory further includes instructions executable by the processor to generate an alert responsive to the event meeting an alert threshold of the event rule. The memory further includes instructions executable by the processor to bind the alert to a configuration item identified using at least one configuration item type and at least one configuration item attribute included in the event rule. The memory further includes instructions executable by the processor to enrich the alert by adding one or more attributes of the configuration item to the alert according to enrichment criteria included in the event rule.

In an implementation, a method is provided for processing events. The method comprises receiving an event from an event source. The method further comprises determining that the event is associated with an event rule based on criteria of the event rule. The method further comprises generating an alert responsive to the event meeting an alert threshold of the event rule. The method further comprises binding the alert to a configuration item identified using at least one configuration item type and at least one configuration item attribute included in the event rule. The method further comprises enriching the alert by adding one or more attributes of the configuration item to the alert according to enrichment criteria included in the event rule.

In an implementation, a non-transitory computer-readable storage medium is provided comprising processor-executable routines that, when executed by a processor, facilitate a performance of operations. The operations comprise sequentially receiving user input to build an event rule. The user input includes any of criteria of the event rule, an alert threshold, an alert definition, a configuration item type, a configuration item attribute, or enrichment criteria. The operations further comprise testing the event rule by applying the event rule to a plurality of test events. The operations further comprise publishing the event rule.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 14 is an illustration of an example graphical user interface of software for receiving alert enrichment criteria.

FIG. 15 is an illustration of an example graphical user interface of software for selecting a test event for testing an event rule.

DETAILED DESCRIPTION

Figure 1:
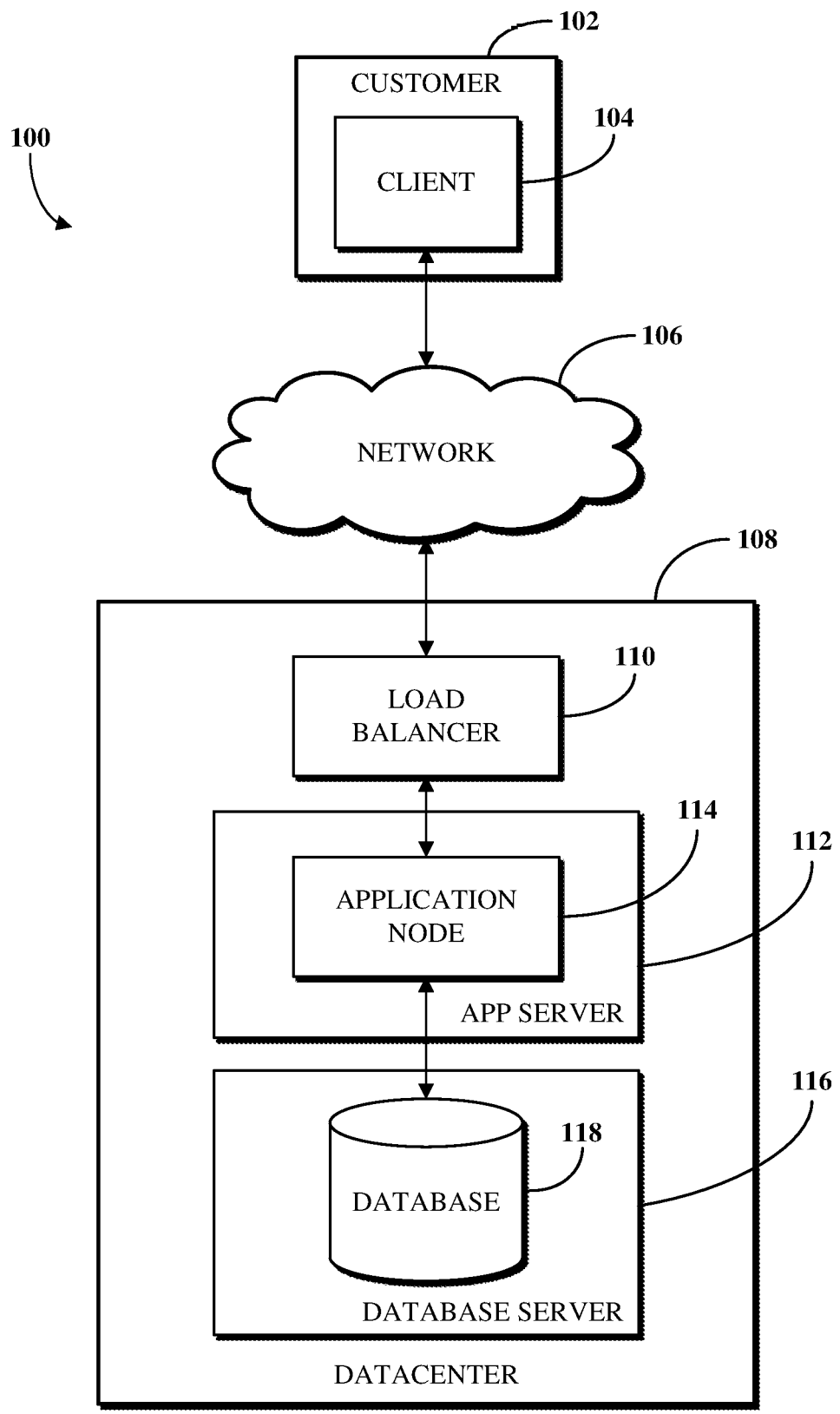
FIG. 1 is a block diagram of an example of an electronic computing and communications system.

Alerts reflect changes in the status or configuration of one or more components of a computer network. For example, an alert can reflect an increase in processor or memory usage of a server executing a Java Virtual Machine (JVM), an outage of an email exchange server, a security threat identified by a distributed threat analytics engine, or the like. An alert can be processed to identify and resolve issues occurring with respect to the computer network.

An alert can be generated based on an event associated with the computer network. An event is a notification of the state or change in state of hardware or software associated with a computer network. For example, an event can indicate a physical attribute of a device, such as CPU temperature, CPU usage, CPU speed, memory usage, disk usage, disk speed, and the like. For example, an event can indicate information associated with software, such as the status of a process executing on a device, a number of semaphores, and the like. For example, an event can indicate a logged message, warning, or error associated with the computer network. In another example, an event can indicate that a database record has been inserted into a table associated with a component of the computer network, updated within that table, or deleted from that table. Event sources, such as monitoring tools, can be used to identify events. Management software for managing the computer network can receive data indicative of the event from a monitoring tool and process it to generate an alert.

In some cases, logic for generating alerts based on events, such as event rules, can be built for use with the management software. For example, an event rule can indicate how to transform raw data associated with particular types of events into meaningful output (e.g., alerts) usable by an administrator or like user of a computer network. However, the process for building an event rule may be complex and unstructured. For example, that process may require a user to write complex operations for determining the types of identified events and for generating alerts including the specific information necessary to resolve issues associated with the events.

For example, the process for building an event rule may not permit associating components of the computer network with a generated alert. A generated alert indicates that an event identified for the computer network has something to do with one or more particular software or hardware component thereof. As such, the omission of specific information about the components that may be affected by events may further complicate the process for building event rules.

Further, once an event rule is built, it may be desirable to test the event rule to verify that alerts are properly being generated from events. Without a testing facility for event rules, it may be difficult to effectively test event rules before they are used. For example, the testing of an event rule in production may cause false alerts to be generated for the computer network. For example, data indicative of the false alerts may be stored in a database table used by the computer network to store actual alerts affecting the components thereof. In some cases, it may not be apparent as to which of the data stored in the table corresponds to actual or false alerts.

Implementations of this disclosure address problems such as those described above by management software implementing a structured process in software for building and testing event rules and for processing events using those event rules. Graphical user interfaces configured to receive user input for building an event rule are sequentially transmitted to a client in communication with the management software. The user input sequentially received responsive to the graphical user interfaces is used to define criteria for using the event rule to process an event and to identify attributes of components with which an alert generated using the event rule will be associated. The event rule can be tested using test events prior to being published for use by the management software. Such a testing facility can be configured to not affect production data associated with actual alerts. An event received from an event source can be processed using the event rule by determining that the event is associated with an event rule based on the criteria of the event rule and generating an alert responsive to the event meeting an alert threshold of the event rule. The alert is bound to a configuration item identified using information included in the event rule. The alert is then enriched by adding attributes of the identified configuration item to the alert according to enrichment criteria included in the event rule.

Implementations of this disclosure provide technological improvements particular to computer networks, for example, those concerning the generation of alerts based on events received from event sources monitoring the components of computer networks. Computer network-specific technological problems such as those can be wholly or partially solved by implementations of this disclosure. For example, implementations of this disclosure include graphical user interfaces for sequentially receiving user input used to identify attributes of particular components that will be associated with an alert and to enrich the alert using attributes of those components. The event rules are testable without generating false alert data for the computer network. When an event is later received from an event source, it is processed using the event rule by binding an alert generated therefor to the component identified in the event rule and enriching the alert using attributes of that component. Implementations of this disclosure can thus introduce new and efficient improvements in the ways in which events are processed for computer networks, such as by facilitating the generation of alerts including meaningful output for resolving issues occurring within the computer networks.

Figure 2:
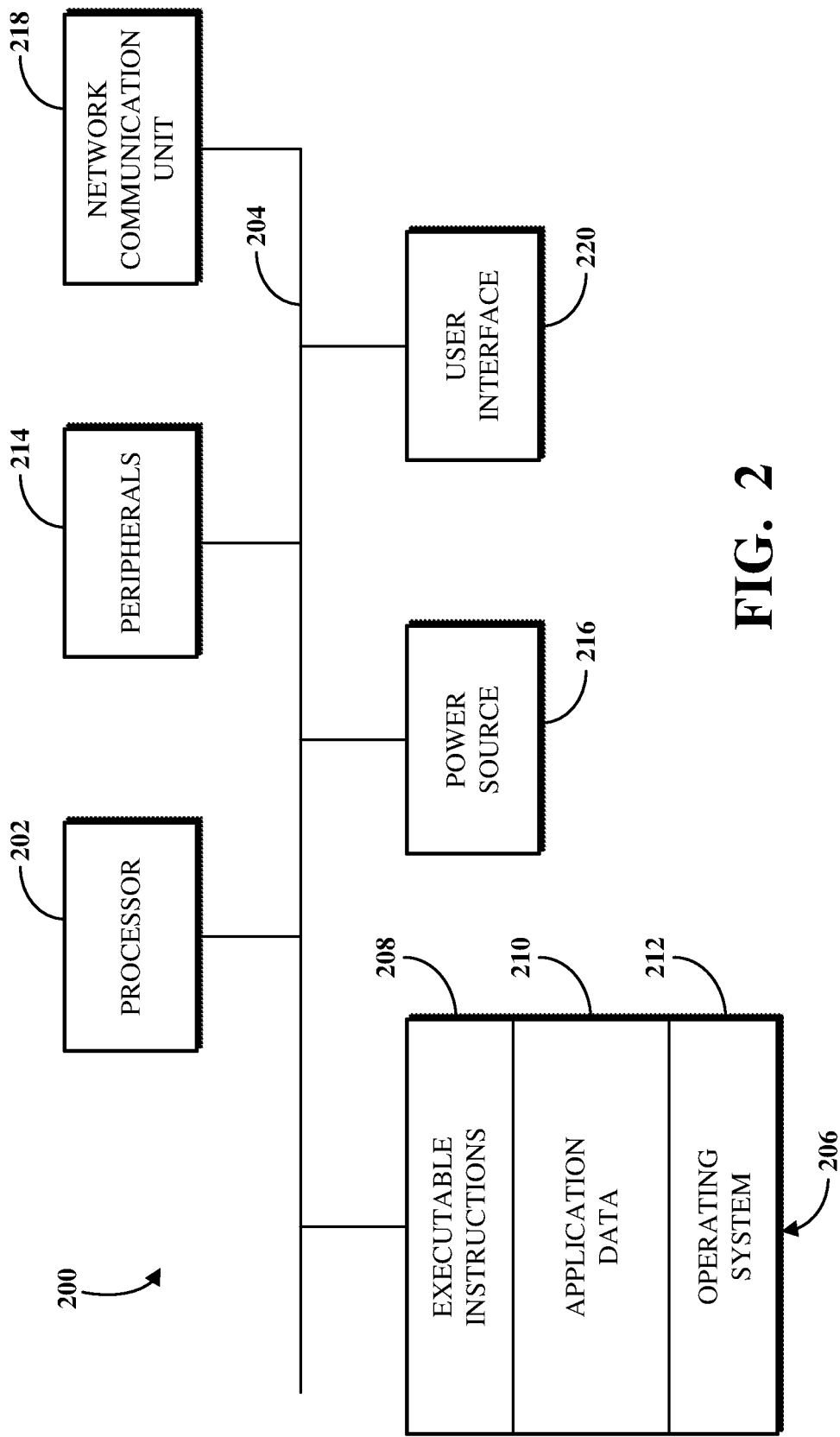
FIG. 2 is a block diagram of an example internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, one or more application nodes 114 and one or more database nodes 118 can implement management software. The management software can include an event rule generator for building event rules and an event processor for processing events using the event rules. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein.

For example, the executable instructions 208 can include instructions to receive an event from an event source, determine that the event is associated with an event rule based on criteria of the event rule, generate an alert responsive to the event meeting an alert threshold of the event rule, bind the alert to a configuration item identified using at least one configuration item type and at least one configuration item attribute included in the event rule, and enrich the alert by adding one or more attributes of the configuration item to the alert according to enrichment criteria included in the event rule. In another example, the executable instructions 208 can include instructions to sequentially receive user input to build an event rule, test the event rule by applying the event rule to a plurality of test events, and publish the event rule.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
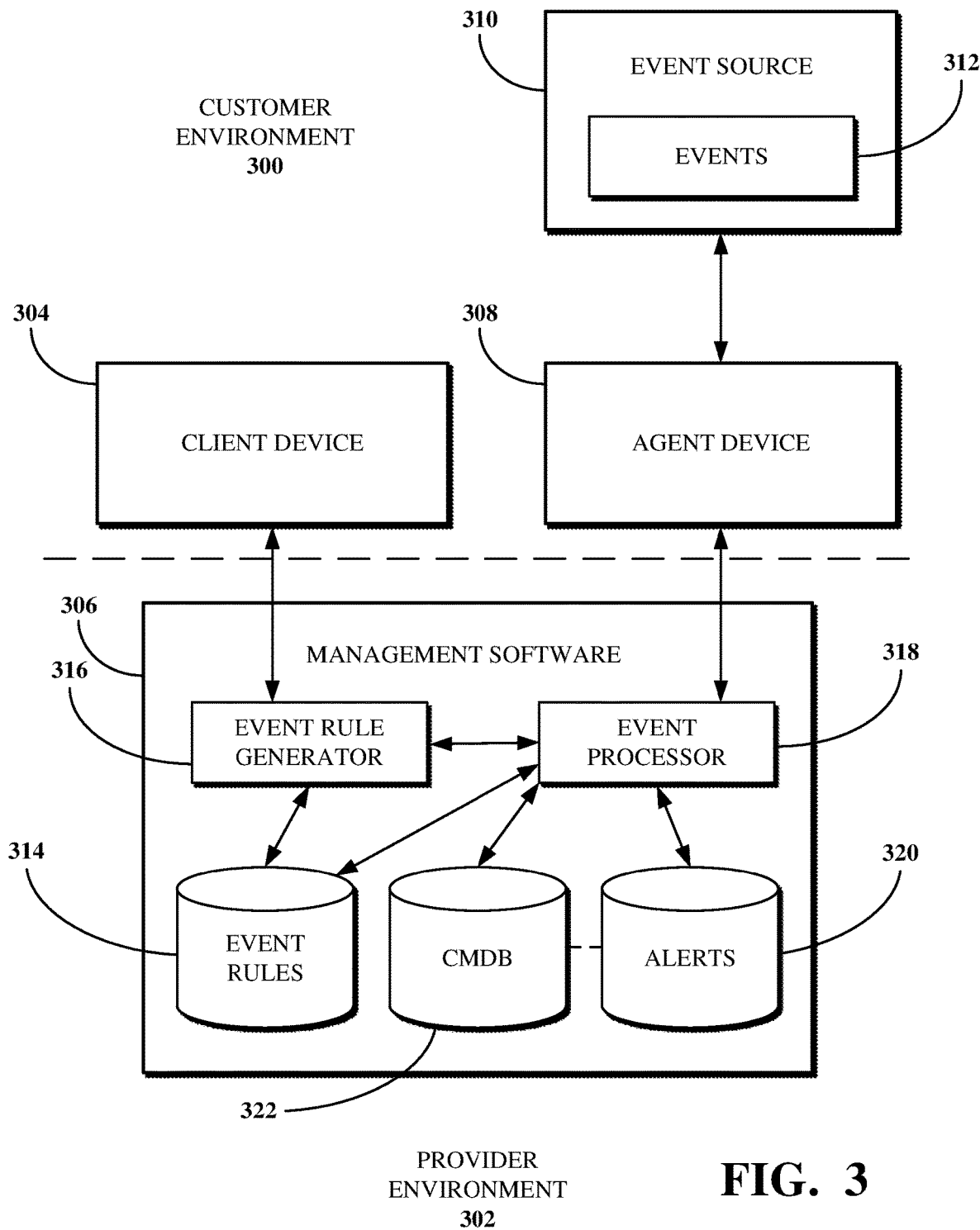
FIG. 3 is a block diagram of an example of a system for processing events using event rules.

FIG. 3 is a block diagram of an example of a system for processing events using event rules. The system includes a customer environment 300 and provider environment 302. The customer environment 300 can refer to, for example, the customer 102 shown in FIG. 1. The customer environment 300 can include one or more computer networks. The customer environment 300 can include hardware and software components under the partial or total control of the customer, such as a client device 304. The client device 304 can be a computing device, such as the computing device 200 shown in FIG. 2. The client device 304 can refer to, for example, the client 104 shown in FIG. 1.

The client device 304 or another component under the partial or total control of the customer environment 300 can be a hardware devices operating at a physical location controlled by a customer of a computing provider, software executing on such a hardware device, software executing on another device operating at physical locations not controlled by the customer (e.g., cloud services executing on server devices of a third-party Software-as-a-Service (SaaS) provider environment), virtual machines implementing software, or the like, or a combination thereof.

The provider environment 302 includes software and hardware controlled by a computing provider, such as of a Platform-as-a-Service (PaaS) or SaaS computing service. The provider environment 302 can refer to, for example, software executing at the datacenter 108 shown in FIG. 1. The provider environment 302 includes management software 306 that can be implemented using one or more application nodes or database nodes, such as the application node 114 or the database node 118 shown in FIG. 1. The management software 306 includes functionality for managing a computer network of the customer environment 300.

For example, the management software 306 can include one or more Information Technology Service Management (ITSM) tools, Information Technology Operations Management (ITOM) tools, or the like, or combinations thereof. The functionality of the management software 306 can be provided as part of a PaaS or SaaS computing service implemented by components of the provider environment 302, on-premises components within the customer environment 300, or a combination thereof. For example, the management software 306 can be an instance of platform software operated by a PaaS computing provider.

The customer environment 300 can be bounded by firewalls, routers, or other gateway devices that separate customer-controlled networks and devices from external networks and devices, such as connections to the Internet or components controlled by third parties. For example, the customer environment 300 can include a firewall that prevents components of the provider environment 302 from accessing components of the customer environment 300. As such, the customer environment 300 includes an agent device 308 for facilitating the communication and movement of data between hardware operating or software executing outside of the customer environment 300 (e.g., outside of a computer network of the customer environment 300) and hardware operating or software executing within the customer environment 300. The agent device 308 is a computing device, for example, the computing device 200 shown in FIG. 2.

Software executing on the agent device 308 can permit communication between components of the provider environment 302 and the customer environment 300, for example, by initiating a connection from within the customer environment 300 to the provider environment 302 using an HTTP protocol permitted by a firewall of the customer environment 300. The agent device 308 can thus be used for operations directed by the management software 306 within the customer environment 300, such as for processing events associated with the customer environment 300.

The agent device 308 receives events 312 associated with a computer network of the customer environment 300 from an event source 310. The event source 310 is or otherwise includes a monitoring tool that identifies the events 312. Examples of the event source 310 can include, but are not limited to, Netcool®/OMNIbus® ObjectServers and Impact Servers, Microsoft® System Center Operations Manager servers, and Solarwinds® Log & Event Manager servers.

The agent device 308 can open up a connection to the management software 306 of the provider environment 302. The agent device 308 can use the open connection to transmit the events 312 received from the event source 310 to the management software 306. For example, the agent device 308 can push ones of the events 312 to the management software 306 for processing, such as without first receiving a request for the events from the management software 306. In another example, the management software 306 can transmit a request for an open connection between it and the agent device 308.

The management software 306 includes functionality for building event rules 314 and processing the events 312 received from the event source 310 using the event rules 314. For example, the management software 306 includes an event rule generator 316 configured to build ones of the event rules 314 based on user input received from the client device 304. The management software 306 also includes an event processor 318 for processing ones of the events 312 using ones of the event rules 314 to generate alerts 320. The event processor 318 can generate alerts 320 using data stored in a CMDB 322. The CMDB 322 can include CIs representative of components of one or more computer networks of the customer environment 300.

The event rule generator 316 can include a structured process in software for receiving user input to build an event rule from the client device 304. For example, the event rule generator 316 can generate one or more graphical user interfaces configured to receive user input from the client device 304. The graphical user interfaces can be sequentially transmitted to the client device 304 for display in a display order. The event rule generator 316 can sequentially receive user input for building an event rule responsive to the sequentially transmitted graphical user interfaces. The user input sequentially received from the client device 304 can include one or more of criteria of the event rule, an alert threshold, an alert definition, a CI type, a CI attribute, enrichment criteria, or the like, or a combination thereof. For example, the event rule generator 316 can sequentially transmit a first graphical user interface that receives the enrichment criteria to the client device 304 after a second graphical user interface that receives the CI type. The client device 304 can sequentially receive and display the first graphical user interface after the second graphical user interface. Examples for sequentially transmitting graphical user interfaces to a client and sequentially receiving user input from the client are further described below with respect to FIG. 7.

The event processor 318 receive the events 312 from the event source 310. For example, the agent device 308 can use an open channel to the management software 306 to transmit the events 312 received from the event source 310 to the event processor 318. The event processor 318 can include functionality of a Representational State Transfer (ReST) application programming interface (API) for storing the events received from the agent device 308. For example, the event processor 318 can specify a ReST endpoint associated with a database or like table used to store events until they are processed using the event rules 314.

The event processor 318 includes functionality for determining that an event received from the event source 310 is associated with an event rule, generating an alert based on the event and event rule, binding the alert to a CI of the CMDB 322, and enriching the alert using attributes of the CI. The event processor 318 determines whether the event is associated with an event rule based on criteria included in user input used to build the event rule. For example, the criteria can include filters defined for the event rule. If characteristics of the event meet values of the defined filters, the event processor 318 can determine that the event is associated with the event rule. The event processor 318 generates the alert responsive to a determination that the event meets an alert threshold of the event rule. The alert threshold can include one or more threshold values for one or more of the filters defined for determining that the event is associated with the event rule.

The event processor 318 binds the alert to a CI of the CMDB 322 identified using at least one CI type and at least one CI attribute included in the event rule. The event processor 318 then enriches the alert by adding one or more attributes of that CI to the alert according to enrichment criteria included in the event rule. The alert is made available to an administrator or like user of the customer environment 300, for example, to resolve an issue associated with the alert. Binding and enriching the alert can facilitate the resolution of the issue, for example, by indicating aspects of a component of the computer network to investigate. Examples for processing an event using an event rule to generate, bind, and/or enrich an alert are further described below with respect to FIG. 4.

The event processor 318 further includes functionality for testing the event rules 314 built using the event rule generator 316. For example, responsive to building an event rule, a user of the client device 304 can test the event rule by applying the event rule to a plurality of test events. The user can select the plurality of test events from a list of available test events within the management software 306. Whereas the generation of an alert by the event processor 318 causes changes to data associated with the management software 306 (e.g., by storing data indicative of the alert, such as within a database associated with the management software 306), the testing of the event rule omits changes to the data associated with the management software. The event processor 318 can publish the event rule, for example, responsive to a successful test thereof. Examples for testing an event rule build using sequentially received user input are further described below with respect to FIG. 6.

Implementations of the system depicted in FIG. 3 can include additional, less, or combined functionality as compared to that described above, or functionality other than that described above, or combinations thereof. In some implementations, the agent device 308 can be omitted. For example, the management software 306 may be installed as on-premises software within the customer environment 300. In such implementations, the actions performed by the agent device 308 can be performed by the management software 306 or omitted, as applicable.

In some implementations, the graphical user interfaces sequentially transmitted to the client device as part of the software for building an event rule may not be generated by the event rule generator 316. For example, the management software 306 can include a separate graphical user interface generator (not shown) that generates the graphical user interfaces of the software. The event rule generator 316 can transmit a generated graphical user interface to the client device 304 responsive to, for example, retrieving it from a database or other data store to which the graphical user interface generator stores the generated graphical user interfaces, receiving it directly from the graphical user interface generator, or the like, or a combination thereof.

In some implementations, the event rule generator 316 can include functionality for testing the event rules 314 before they are published. For example, the event rule generator 316 can have access to the list of test events otherwise available to the event processor 318. The event rule generator can test an event rule using a plurality of the test events. Results of the testing can indicate whether the event rule sufficiently generates alerts based on the test event data (e.g., the event criteria, CI types, CI attributes, enrichment criteria, and/or other data associated with the test events). In such implementations, the event processor 318 can omit the functionality for testing the event rules 314 before they are published.

In some implementations, the event processor 318 can process an event using multiple ones of the event rules 314. For example, a first event rule used by the event processor 318 to process an event may not be usable to generate an alert, such as where the event does not meet an alert threshold of the first event rule. The event processor 318 can determine that a second event rule is also associated with the event and use that second event rule to generate an alert therefor. Examples for processing an event using multiple event rules are further described below with respect to FIG. 5.

Figure 4:
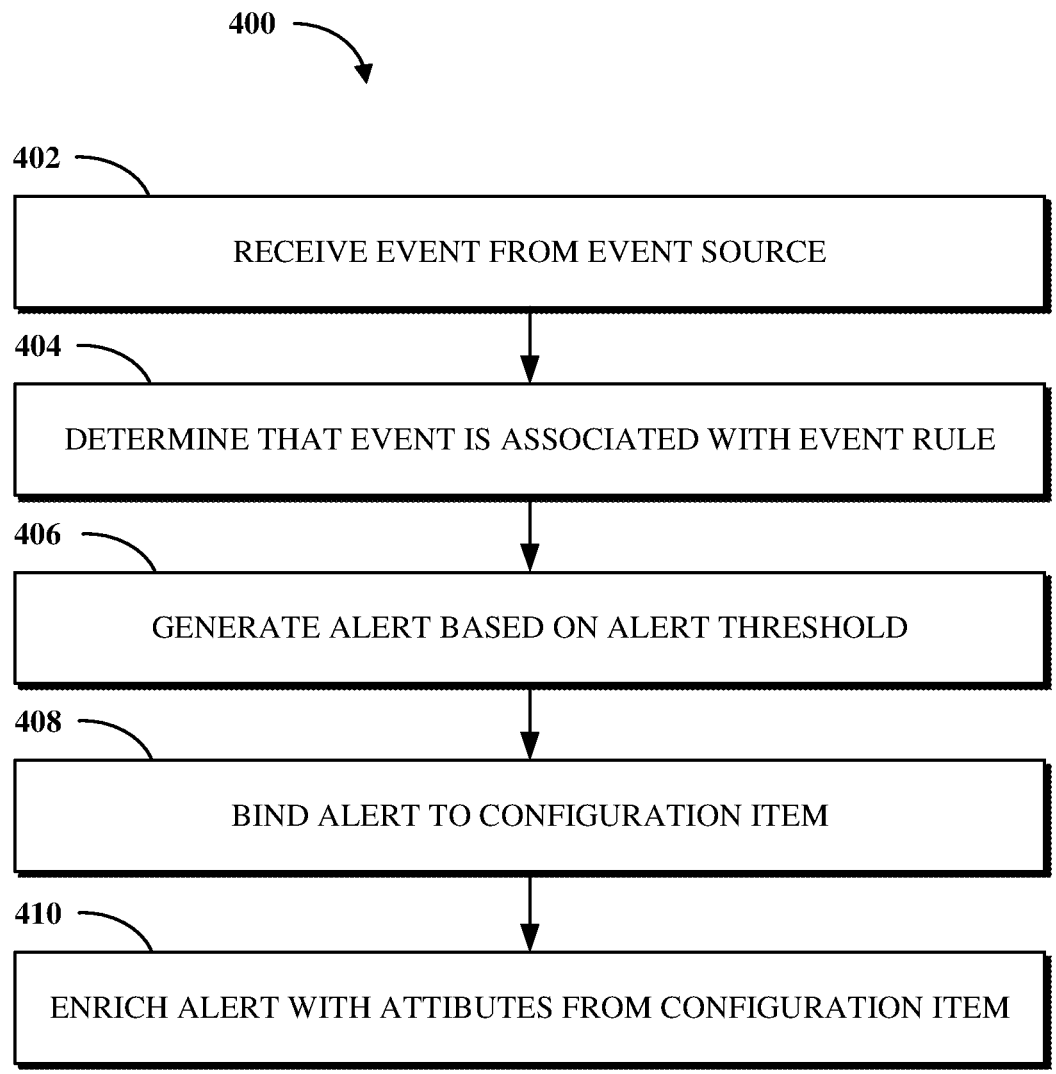
FIG. 4 is a flowchart illustrating an example of a technique for processing events using one event rule.
Figure 5:
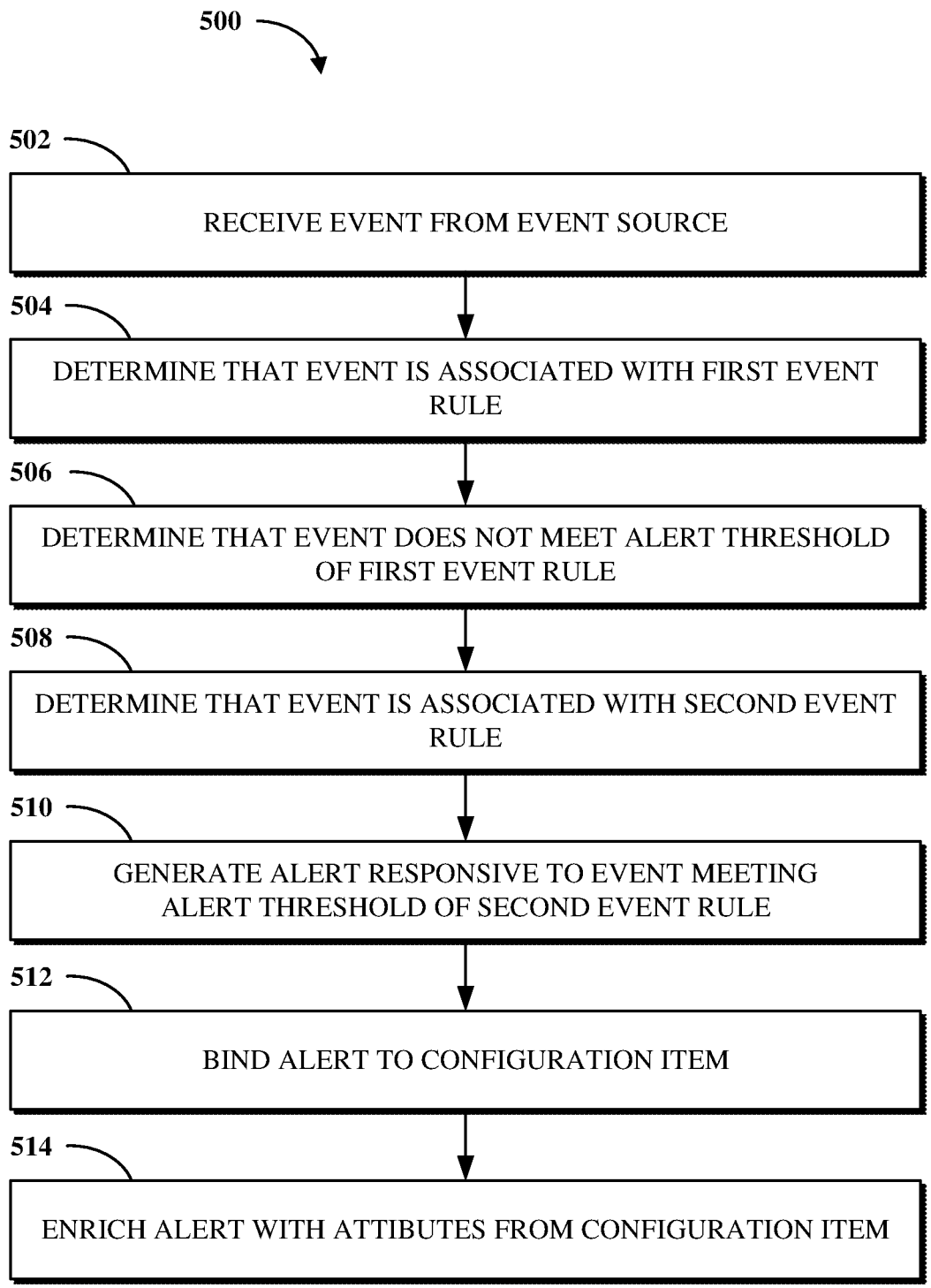
FIG. 5 is a flowchart illustrating an example of a technique for processing events using multiple event rules.
Figure 6:
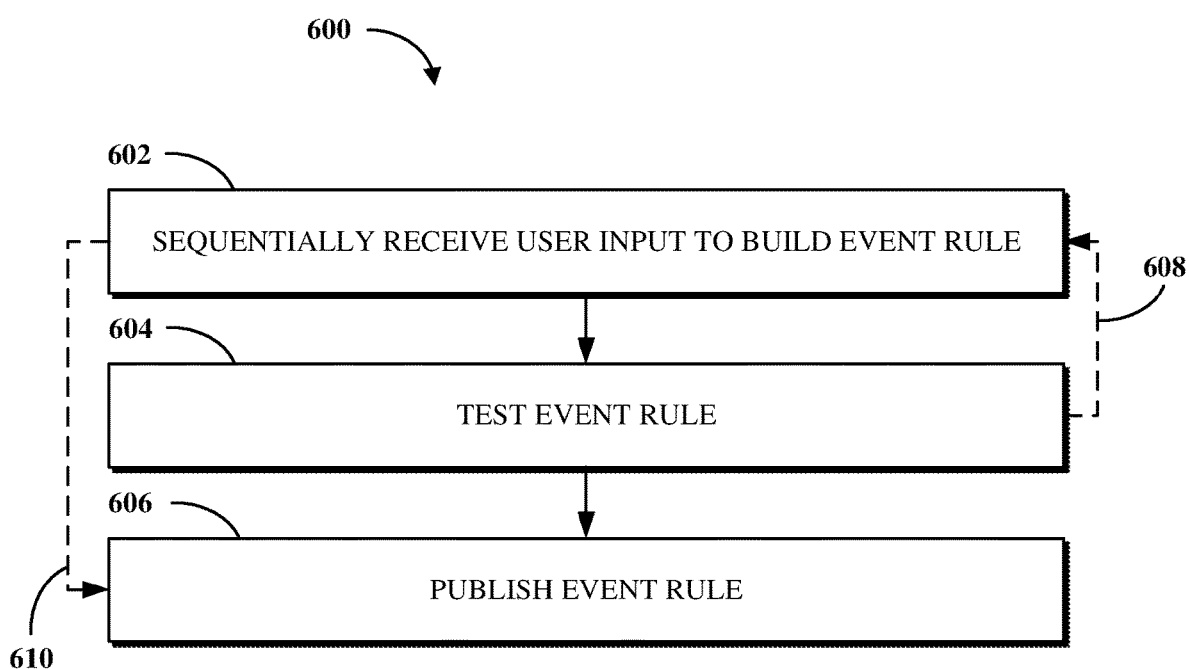
FIG. 6 is a flowchart illustrating an example of a technique for testing event rules.

FIG. 4 is a flowchart illustrating an example of a technique 400 for processing events using one event rule. FIG. 5 is a flowchart illustrating an example of a technique 500 for processing events using multiple event rules. FIG. 6 is a flowchart illustrating an example of a technique 600 for testing event rules. One or more of the technique 400, the technique 500, or the technique 600 can be executed using computing devices, such as the systems, modules, and devices described with respect to FIGS. 1-3. For example, one or more of the technique 400, the technique 500, or the technique 600 can be performed, for example, using one or more of the event rule generator 316, the event processor 318, or other functionality of the management software 306 shown in FIG. 3.

One or more of the technique 400, the technique 500, or the technique 600 can be performed, for example, by executing a machine-readable program or other computer-executable instructions, such as instructions or programs described according to JavaScript, C, or other such instructions. The steps, or operations, of the technique 400, the technique 500, the technique 600, or any other technique, method, process, or algorithm described in connection with the implementations disclosed herein can be implemented directly in hardware, firmware, software executed by hardware, circuitry, or a combination thereof.

Although the technique 400, the technique 500, and the technique 600 are each shown as a series of operations for clarity, implementations of the technique 400, the technique 500, the technique 600, or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Referring first to FIG. 4, a flowchart illustrating an example of the technique 400 for processing events using one event rule is shown. In an implementation, the technique 400 includes receiving an event from an event source via 402, determining that the event is associated with an event rule via 404, generating an alert based on an alert threshold via 406, binding the alert to a CI via 408, and enriching the alert with attributes of the CI via 410.

At 402, an event is received from an event source. The event can be received directly from the event source. Alternatively, the event can be received from an intermediary software or hardware component in communication with the event source. For example, the event can be received from an agent device operating in a computer network of a customer environment within which the event occurred. The agent device can receive the event from the event source. The event can then be received from the agent device, for example, over a connection opened by the agent device.

At 404, a determination is made as to whether the event received at 402 is associated with criteria an event rule of a customer environment. For example, the criteria of an event rule can include one or more filters associated with characteristics of events. Examples of characteristics of events include an event source (e.g., the event source 310), an event type (e.g., a category used by the event source 310 to identify the event), a node (e.g., a component, for example, a physical or virtual device, on which the event occurred), a metric name (e.g., a resource of the node, for example, memory or processor usage), a description (e.g., a condition for the event, for example, used memory greater than a threshold value), or the like. The criteria can be used to define values for the characteristics that, if met by an event, cause the event rule to be used for processing the event.

Determining that the received event is associated with event rule at 404 can include matching the event to an event rule according to the criteria of the event rule. For example, values characteristics of the event can be compared to the values defined for filters associated with a plurality of event rules. The event can be determined to match an event rule where the characteristics of the event match the filters of one of the event rules of the plurality.

At 406, responsive to determining that the event received at 402 is associated with an event rule of the customer environment, an alert is generated. Generating the alert can first include determining that the event meets an alert threshold of the event rule. The alert threshold can include one or more threshold values for one or more of the filters defined for determining that the event is associated with the event rule at 402. For example, an alert threshold can be defined using an alert operator (e.g., greater than, less than, equal to, or the like), a field name (e.g., one of the defined filters), a value (e.g., for the filter of the field name), an occurrence (e.g., a number of times for the value to be met), a time interval (e.g., a period of time for measuring the occurrence), other criteria, or a combination thereof. For example, an alert threshold can indicate to generate an alert for an event where a particular metric value is greater than 1.5 on three occasions over a ten minute time interval.

The alert is generated responsive to determining that the alert threshold is met. The alert is generated according to an alert definition used to build the event rule. The alert definition can include, for example, information about the output of the alert. The alert definition can indicate at least one event attribute, which, for example, can reflect one or more values for characteristics of the event received at 402. For example, the criteria of the event rule can include a function of the event attribute. The function can include a regular expression (regex) defined using the values of the event characteristics. Building the event rule can include configuring the alert definition using one or more regexes to reflect a description of the alert, a component of the computer network associated with the alert, additional information, or the like, or a combination thereof.

At 408, the alert generated at 406 is bound to a CI representing a component of the customer environment within a CMDB associated with the customer environment. The CI to which the alert is bound can be identified using at least one CI type and at least one CI attribute included in the event rule. For example, the event rule can include information indicating that the generated alert is to be bound to an application server CI type. A CI attribute included in the event rule can be associated with a CI type included in the event rule. For example, the event rule can include information indicating that the generated alert is to be bound to an application server CI type that runs a specific process or routine. The process or routine can be specified in the event rule, for example, using a regex.

However, there may be multiple CI types included in the event rule. The multiple CI types can be unrelated. For example, one CI type can be of an application server and another CI type can be of a database server. Alternatively, the multiple CI types can be related, such as by a parent-child relationship. For example, a first CI type can be of an application server. A second CI type may be a hardware of the application server. The at least one CI attribute used to bind the alert to the CI can be an attribute of the application server CI type or an attribute of the application server hardware CI type. For example, an application server CI can be bound to the alert based on the hardware thereof having a particular serial number.

Binding an alert to a CI can include associating an identifier of the CI with the alert generated at 406. For example, the at least one CI type and at least one CI attribute included in the event rule can be processed against a CMDB of the computer network to identify the CI to which to bind the alert. The CMDB can be queried for a CI matching the at least one CI type and at least one CI attribute. Responsive to identifying a matching CI within the CMDB, an identifier of that CI can be used to bind the alert thereto. For example, an additional field including the identifier of the CI can be added to the alert to identify the CI in the output of the alert.

At 410, the alert is enriched by adding one or more attributes of the CI to which it is bound to the alert. Enriching the alert at 410 can include updating the alert to include those one or more attributes. The attributes of the CI added to the alert are determined according to enrichment criteria included in the event rule. For example, the event rule can include enrichment criteria indicating that the alert should include an IP address of the component represented by the CI. The alert can thus be enriched by updating it to include the IP address of that component. Enriching the alert can result in the benefit of accessing relevant information of the component without having to join tables from the CMDB, which may result in faster performance.

The attributes of the CI added to the alert at 410 may be the same attributes as used to identify the CI at 408. Alternatively, the attributes of the CI added to the alert at 410 may be different from the attributes used to identify the CI at 408. For example, where the CI bound to the alert at 408 is an application server, a serial number of hardware of the application server may be used to identify the CI within a CMDB. However, the serial number may not be included in the alert. Instead, another attribute of the application server CI or CI types related thereto can be included in the alert. For example, the alert can be enriched to include information indicative of a processor of the application server hardware.

Referring next to FIG. 5, a flowchart illustrating an example of the technique 500 for processing events using multiple event rules is shown. In an implementation, the technique 500 includes receiving an event from an event source via 502, determining that the event is associated with a first event rule via 504, determining that the event does not meet an alert threshold of the first event rule via 506, determining that the event is associated with a second event rule via 508, generating an alert via 510, binding the alert to a CI via 512, and enriching the alert with attributes from the CI via 514.

At 502, an event is received from an event source. For example, the event can be received in the manner described above at 402 in FIG. 4. At 504, a determination is made as to whether the event received at 402 is associated with a first event rule of a customer environment. For example, the determination at 504 can be made in the manner described above at 404 in FIG. 4. At 506, a determination is made as to whether the event received at 502 meets an alert threshold of the first event rule. For example, the determination at 506 can be made in the manner described above at 406 in FIG. 4.

At 508, responsive to a determination that the event does not meet the alert threshold of the first event rule, a determination is made as to whether the received event is associated with a second event rule. The event may be associated with both the first event rule and the second event rule. For example, values of the characteristics of the event may match values of the filters defined for each of the first event rule and the second event rule. However, the values of the applicable characteristics of the event rule may not meet the alert threshold of the first event rule. Values of the same or different characteristics of the event may then be compared to an alert threshold of the second rule. As such, the event might not be discarded where it does not satisfy a first event rule to which the event is applied.

At 510, responsive to the event meeting the alert threshold of the second event rule, an alert is generated. At 512, the alert generated at 510 is bound to a CI representing a component of the customer environment within a CMDB associated with the customer environment. For example, the alert can be bound to a CI in the manner described above at 408 in FIG. 4. At 514, the alert is enriched by adding one or more attributes of the CI to which it is bound to the alert. For example, the alert can be enriched in the manner described above at 410 in FIG. 4.

In some implementations, the event received at 502 can be the same event as received at 402 in FIG. 4. For example, the event rule referenced at 404 in FIG. 4 can be the first event rule referenced at 504. The generation of an alert at 406 in FIG. 4 can be responsive to a determination that the received event meets an alert threshold of the first event rule. In some implementations, the event received at 502 can be a different event from the event received at 402 in FIG. 4. For example, the event received at 402 in FIG. 4 can be a first event and the event received at 502 can be a second event.

Referring next to FIG. 6, a flowchart illustrating an example of the technique 600 for testing event rules is shown. In an implementation, the technique 600 includes sequentially receiving user input to build an event rule via 602, testing the event rule via 604, and publishing the event rule via 606.

At 602, the user input used to build an event rule is sequentially received from a client device responsive to graphical user interfaces transmitted from management software to the client device. The user input includes criteria of the event rule, an alert threshold, an alert definition, a CI type, a CI attribute, enrichment criteria, or the like, or a combination thereof. For example, one or more of the foregoing constituents of the user input can be received from each graphical user interface transmitted to the client device. The graphical user interfaces are sequentially transmitted to and displayed at the client device. For example, a first graphical user interface that receives enrichment criteria can be displayed after a second graphical user interface that receives a CI type.

At 604, the event rule built using the sequentially-received user input at 602 is tested. Testing the event rule can include applying the event rule to a plurality of test events. The test events available for testing the event rule at 604 can be stored in a database table associated with the management software that received the user input at 602. The test events can include information used to generate test alerts using the event rule. However, the testing at 604 omits changes to data associated with the management software. For example, the data associated with the management software can be a database table that the management software uses for storing alerts. An alert can be stored in that database table responsive to being generated at the management software (e.g., using event rules, such as described at 406 in FIG. 4). However, test alerts do not indicate actual status or configuration changes for a computer network. As such, test alerts generated responsive to a test at 604 may not be stored in that database table, thus omitting changes thereto. In another example, the testing at 604 may occur without making changes to test events used for the testing. For example, the test events may be stored in a database table having read-only access. At 606, the event rule can be published. Publishing the event rule can include enabling the event rule for use in processing events received from event sources.

In some implementations, the event rule may be published responsive to a successful test of the event rule at 604. For example, the event rule may not be published before determining that the event rule generates appropriate alerts based on the test events. However, in some implementations, the event rule may not necessarily be published responsive to the testing at 604. For example, at 608, the technique 600 can return to 602 for updating the user input previously received for building the event rule and/or for receiving additional user input therefor. For example, the technique 600 can return to 602 via 608 responsive to an unsuccessful test of the event rule. In another example, the technique can return to 602 via 608 responsive to a successful test of the event rule, but where a user building the event rule desires to further optimize the event rule.

For example, the test of the event rule at 604 may indicate that the output of an alert generated using the user input previously received at 602 does not effectively identify issues to resolve in connection with an event (e.g., one or more of the test events processed at 604). This may be because, for example, the criteria of the event does not correctly filter the event to determine to use the event rule, the alert definition is not configured using the correct event attributes, a value of the alert threshold is too high or too low, other reasons, or a combination thereof. Responsive to updating the previously received user input and/or receiving additional user input, the event rule can be retested, such as by the technique returning to 604.

In some implementations, the event rule may be published without first being tested at 604. For example, responsive to building the event rule using user input sequentially received at 602, the technique 600 can skip directly to publishing the event rule at 606 via 610. For example, the user building the event rule may not desire to test the event rule at 604. In another example, the technique 600 may be performed to update an existing event rule. The user may decide that the updates do not require a retest of the event rule.

In some implementations, the event rule may be tested responsive to user input to any or a subset of graphical user interfaces (such as those described in FIG. 7 and depicted in FIGS. 8-16), for example when a portion of an event rule is updated. In some implementations, an event rule may be tested before the sequential process of creating the event rule has completed.

Figure 7:
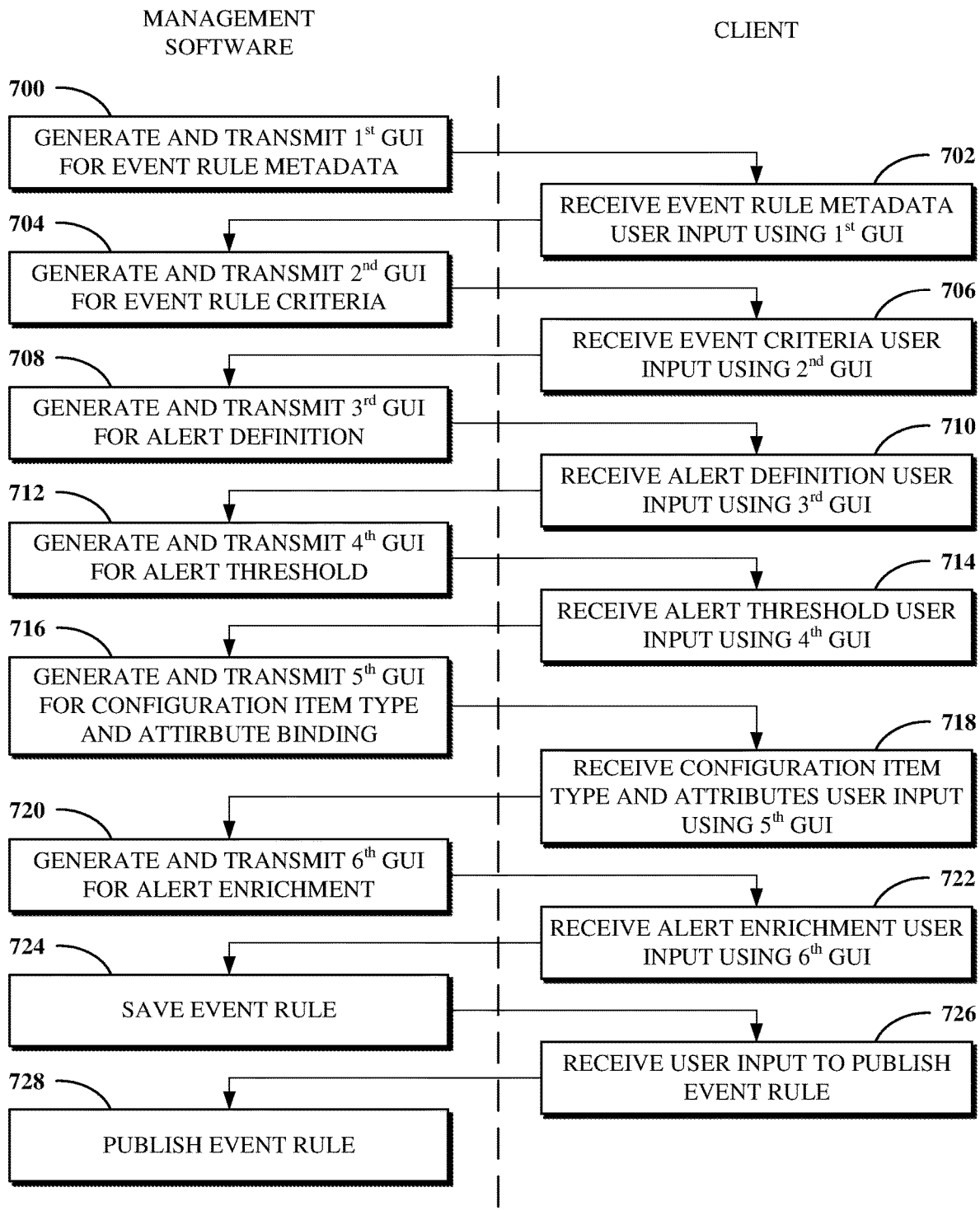
FIG. 7 is a diagram illustrating an example data exchange between management software and a client for building an event rule.

FIG. 7 is a diagram illustrating an example data exchange between management software and a client for building an event rule. The data exchange of FIG. 7 can represent all or a portion of the operations for building an event rule by sequentially transmitting graphical user interfaces to a client and receiving user input from the client responsive to the sequential transmissions. For example, the data exchange of FIG. 7 can refer to the sequential transmission of graphical user interfaces and the sequential receipt of user input described above at 602 in FIG. 6.

The data exchange between the management software and the client shown in FIG. 7 can be facilitated using a structured process in software to build an event rule and/or process a received event using an event rule. The software can be executed on a computing device, for example, a server located in a datacenter (e.g., the datacenter 108 shown in FIG. 1). For example, the software can be implemented by management software executing on the datacenter server (e.g., the management software 306 shown in FIG. 3). The software can be accessed by a client in communication with the customer environment (e.g., the client device 304 and the customer environment 300 shown in FIG. 3).

The software includes functionality for guiding a user of the client through a structured process for building event rules and/or processing events using event rules. The software includes graphical user interfaces generated by the management software that are sequentially transmitted from the management software to the client. The software sequentially receives user input from the client based on the graphical user interfaces transmitted to the client. For example, a first user input may be received from the client responsive to the management software transmitting a first graphical user interface, a second user input may be received from the client responsive to the management software transmitting a second graphical user interface, and so on.

At 700, the management software generates and transmits a first graphical user interface for event rule metadata to the client. The event rule metadata can be metadata used to identify the event rule at the management software. Examples of event rule metadata can include, but are not limited to, a name of the event rule, an event source for receiving events to be processed using the event rule, an order for applying the event rule to the event (e.g., where multiple event rules apply to one event), a description of the event rule, other metadata, or a combination thereof. At 702, user input corresponding to the event rule metadata is received using the first graphical user interface. An example of the first graphical user interface is further described below with respect to FIG. 8.

At 704, the management software generates and transmits a second graphical user interface for criteria of the event rule to the client. The event rule criteria can filters used to determine whether an event received from an event source is associated with the event rule. For example, the event rule criteria can include values of characteristics of events that, if matched to the characteristics of an event received from an event source, indicate that the event rule may be used to generate an alert based on the event. Examples of event rule criteria can include, but are not limited to, a description, resolution state, metric name, severity, priority, other criteria, or a combination thereof. At 706, user input corresponding to the criteria of the event rule is received using the second graphical user interface. An example of the second graphical user interface is further described below with respect to FIG. 9.

At 708, the management software generates and transmits a third graphical user interface for an alert definition to the client. The alert definition includes output information of the alert, such as may be used by an administrator or like user of a computer network to resolve an issue associated with an event corresponding to the alert. Examples of output information that can be in the alert definition include, but are not limited to, an alert description, a component associated with the alert, a metric name, a severity, additional information, other output, or a combination thereof. The alert definition can be configured using regexes defined by a user of the client. At 710, user input corresponding to the alert definition is received using the third graphical user interface. Examples of the third graphical user interface are further described below with respect to FIGS. 10 and 11.

At 712, the management software generates and transmits a fourth graphical user interface for an alert threshold to the client. The alert threshold can include values of event characteristics that, if met by an event received from an event source, indicate that the event rule can be used to generate an alert for the event. Examples of characteristics of an alert threshold can include, but are not limited to, an alert operator, a field name, a value, an occurrence, a time interval, other characteristics, or a combination thereof. At 714, user input corresponding to values of characteristics for the alert threshold is received using the fourth graphical user interface. An example of the fourth graphical user interface is further described below with respect to FIG. 12.

At 716, the management software generates and transmits a fifth graphical user interface for CI type and attribute binding to the client. The CI type and CI attribute can be used to identify a CI of a CMDB to which to bind the alert generated using the event rule. Examples of CI types that can be used to identify a CI can be one or more CI types included in a CMDB of a computer network, such as an application server CI type, a database server CI type, a virtual machine CI type, a router CI type, a switch CI type, and so on. Examples of CI attributes that can be used to identify a CI can be one or more CI attributes associated with CI types of the CMDB, such as a serial number, an IP address, a processor model, a hypervisor, a port, a MySQL version, and so on. At 718, user input corresponding to the CI type and attribute binding is received using the fifth graphical user interface. Examples of the fifth graphical user interface are further described below with respect to FIGS. 13A and 13B.

At 720, the management software generates and transmits a sixth graphical user interface for alert enrichment to the client. The alert enrichment criteria received using the sixth graphical user interface is used to enrich an alert generated using the event rule, such as by adding attributes of a CI to which the alert will be bound. Examples of alert enrichment criteria can include, but are not limited to, a description of the alert and/or the CI, an identifier of the CI, a metric name, a severity, an attribute of the CI (e.g., serial number, IP address, or the like), other criteria, or a combination thereof. At 722, user input corresponding to the alert enrichment is received using the sixth graphical user interface. An example of the sixth graphical user interface is further described below with respect to FIG. 14.

At 724, the event rule is saved. For example, the event rule can be saved responsive to the alert enrichment user input received at 722 using the sixth graphical user interface transmitted to the client. In another example, one or more of the graphical user interfaces generated and transmitted by the management software can include a user interface element that, when triggered, causes data entered thus far to be saved. For example, one or more of those graphical user interfaces can include a "save" button that, when clicked by a user of the client, causes the user input thus far received from the client to be saved. In cases where the data is saved prior to the event rule being fully built, the data can be saved as an event rule draft or otherwise to indicate that the software process for building the event rule has not yet been completed. At 726, user input to publish the event rule is received from the client. At 728, the event rule is published responsive to the user input received at 726. Publishing the event rule at 728 can include enabling the event rule to be used for processing events received from event sources, such as by generating alerts based on those events.

Implementations of the data exchange depicted in FIG. 7 can include additional, less, or combined functionality as compared to that described above, or functionality other than that described above, or combinations thereof. In some implementations, some or all of the graphical user interfaces can be generated prior to the first graphical user interface being transmitted to the client at 700. In some implementations, the user input received at 726 can include user input to test the saved event rule prior to publishing it. For example, the event rule can be tested by applying the event rule to a plurality of test events. The event rule can then be published at 728. For example, the event rule can be published at 728 responsive to a successful test of the event rule using the user input received at 726.

To describe some implementations in greater detail, reference is next made to examples of graphical user interfaces of the structured process in software described above with respect to FIG. 7. A graphical user interface of the software can comprise part of a software graphical user interface constituting data that reflect information ultimately destined for display on a hardware device, such as the client described above with respect to FIG. 7. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Figure 8:
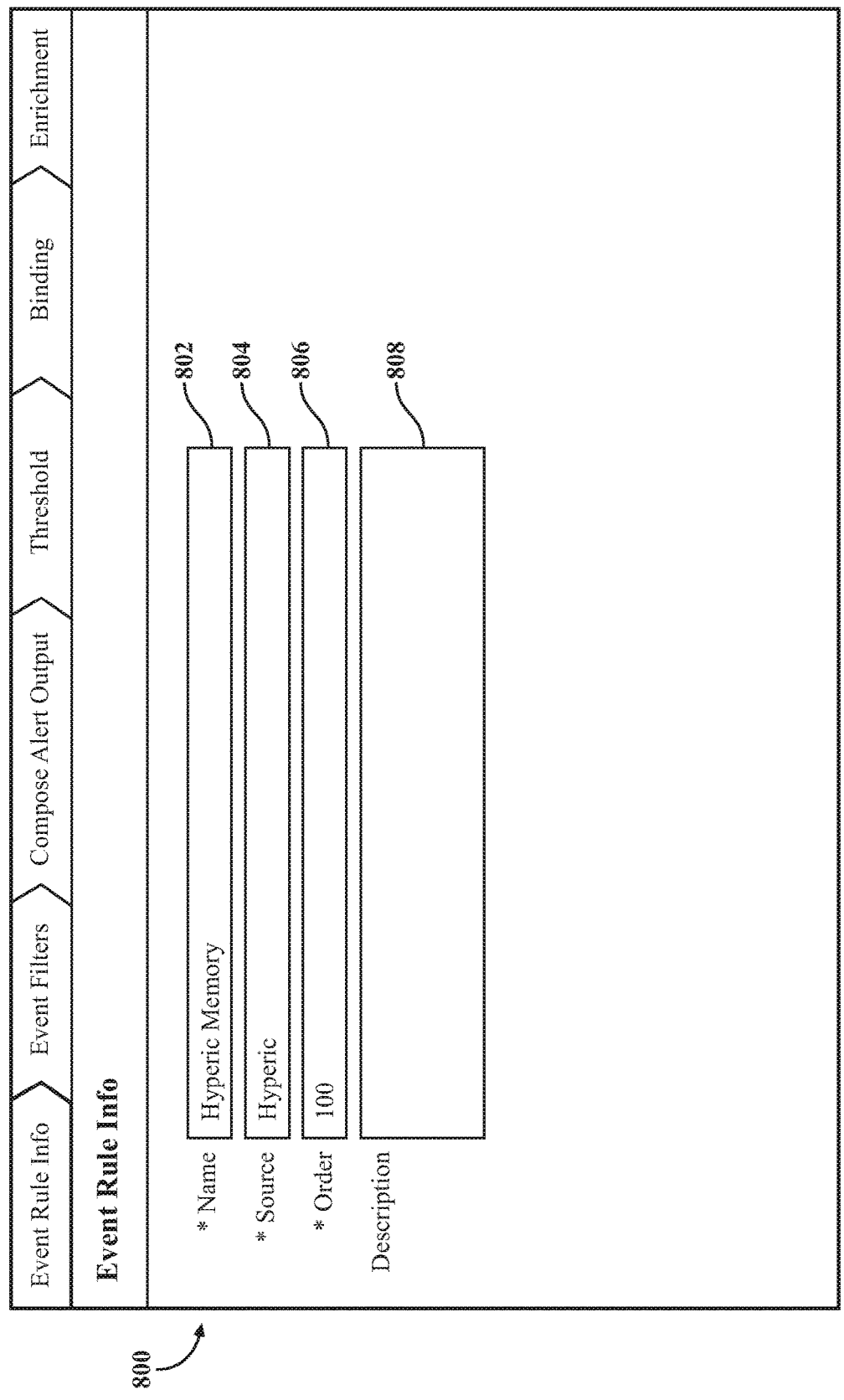
FIG. 8 is an illustration of an example graphical user interface of software for receiving event rule metadata.

FIG. 8 is an illustration of an example graphical user interface 800 of software for receiving event rule metadata. For example, the graphical user interface 800 can be the first graphical user interface described at 700 in FIG. 7. The graphical user interface 800 includes fields 802, 804, 806, and 808. The field 802 receives a name of an event rule to be built. The field 804 receives an event source from which events to be processed using the event rule are received. The field 806 receives an order indicating a priority order for using the event rule to process an applicable event, such as compared to other event rules that may be used to process that event. The field 808 receives a description of the event rule.

Figure 9:
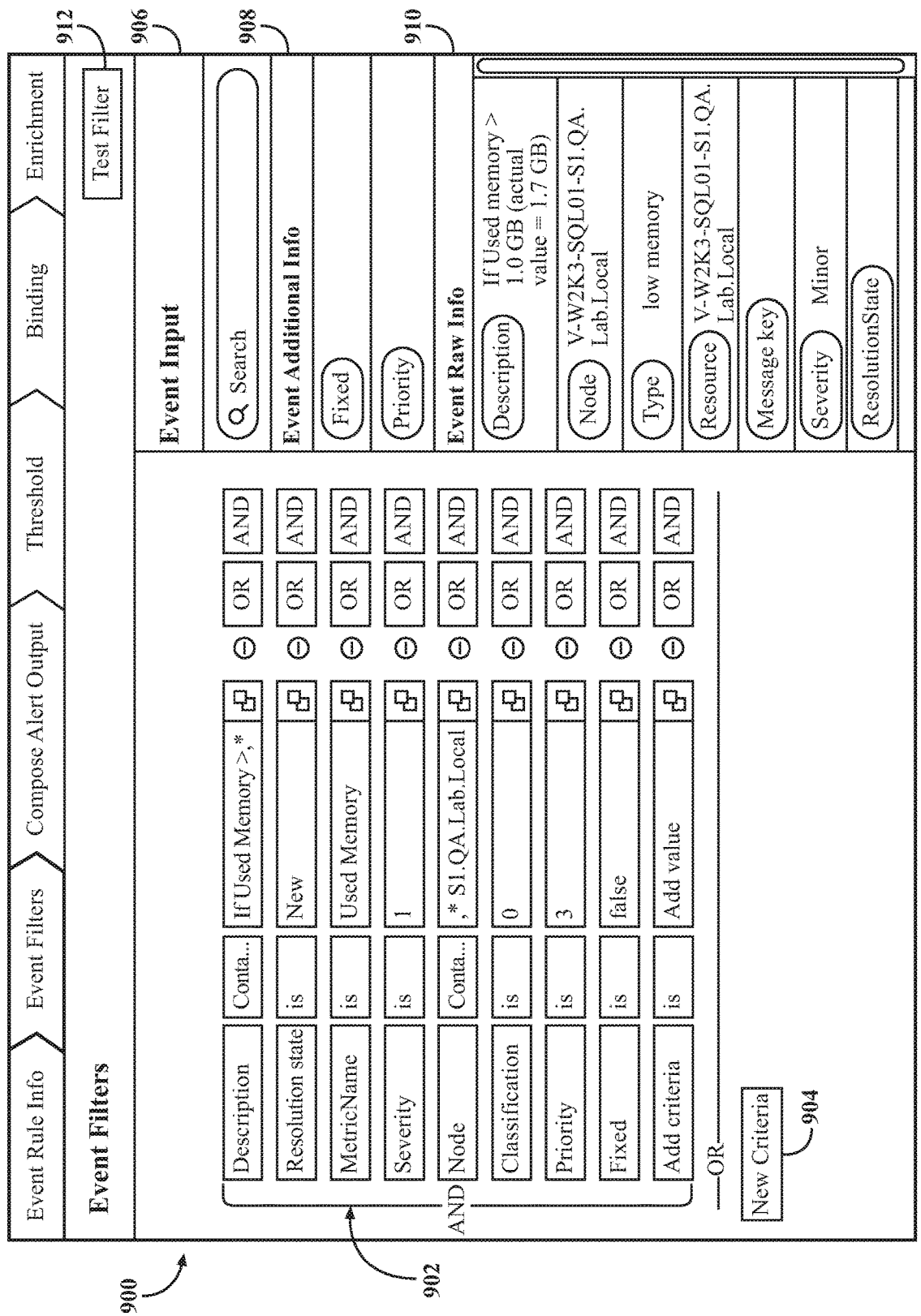
FIG. 9 is an illustration of an example graphical user interface of software for receiving criteria of an event rule.

FIG. 9 is an illustration of an example receiving criteria of an event rule event filters used by an event rule. For example, the graphical user interface 900 can be the second graphical user interface described at 704 in FIG. 7. The graphical user interface 900 includes event criteria 902, a new criteria user interface element 904, a search field 906, an additional info section 908, a raw info section 910, and a test filter user interface element 912. The event criteria 902 includes filters having values for characteristics of events that, if met by an event, indicate that the event rule can be used to process the event. The new criteria user interface element 904 is interactive for adding and configuring other filters to the event criteria 902. The search field 906 can be used to identify characteristics of events that can be processed using event rules. The additional info section 908 includes additional event characteristic information usable for the event criteria. The raw info section 910 includes event characteristic information included by default in the event criteria. The test filter user interface element 912 is interactive for testing a filter, such as against a test event.

The search field 906, the additional info section 908, and the raw info section 910 are included in a frame of the graphical user interface 900 separate from a right-side frame within which the event criteria 902 and the new criteria user interface element 904 are displayed. The right-side frame may be included in other graphical user interfaces of the software and may include the same or different contents in each of the graphical user interfaces that include it. A user of the software can select for contents of the right-side frame to be included in fields of a graphical user interface, such as by dragging a content from the right-side frame and dropping it into the appropriate field.

Figure 10:
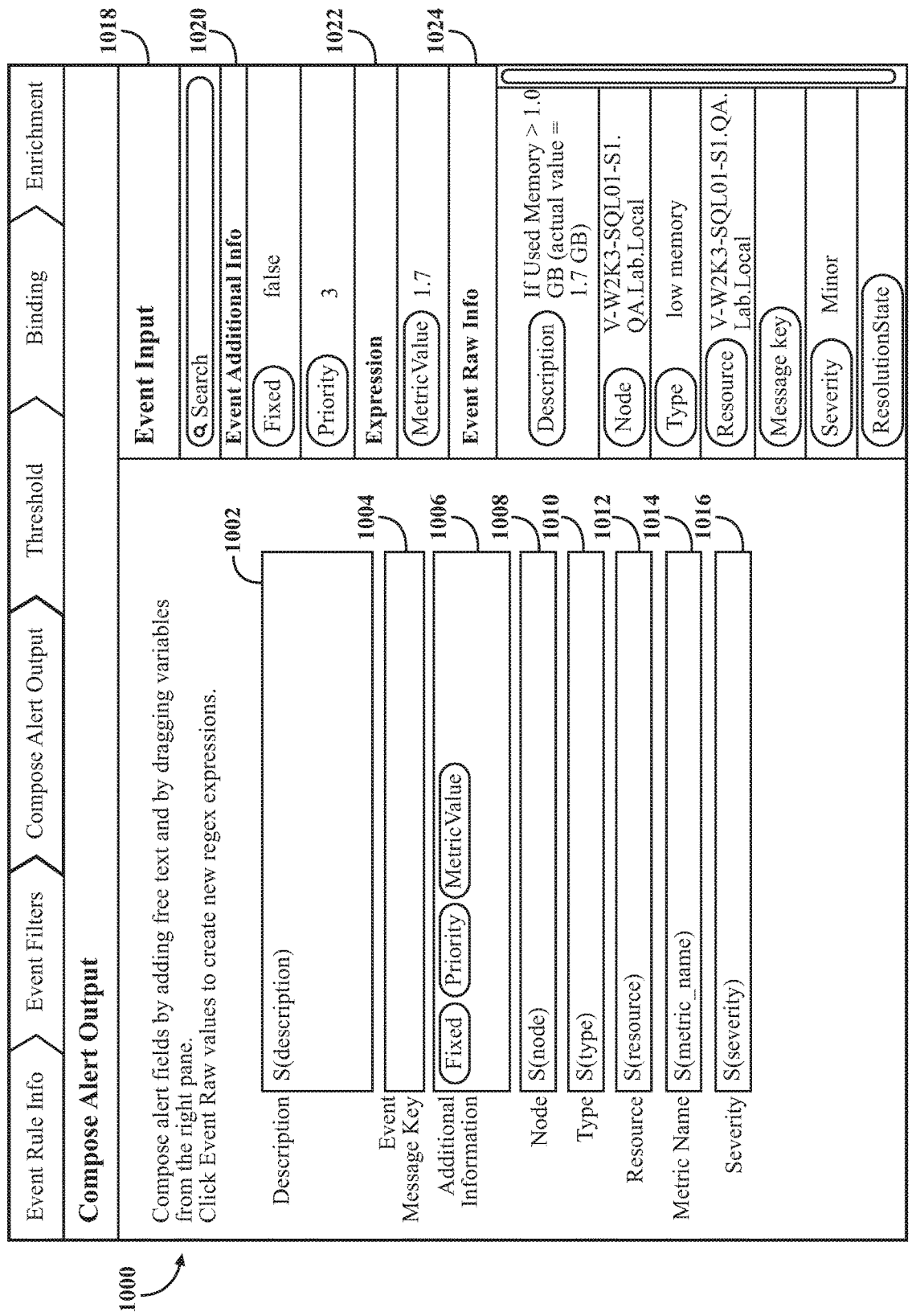
FIG. 10 is an illustration of an example graphical user interface of software for receiving an alert definition.

FIG. 10 is an illustration of an example graphical user interface 1000 of software for receiving an alert definition. For example, the graphical user interface 1000 can be the third graphical user interface described at 708 in FIG. 7. The graphical user interface 1000 includes fields 1002, 1004, 1006, 1008, 1010, 1012, 1014, and 1016. The field 1002 receives a description of an alert to be generated by the event rule. The field 1004 receives or otherwise generates an event message key that is a unique identifier based on a combination of the characteristics of the alert (e.g., the component to which it applies, the event source, the severity, or the like, or a combination thereof). The field 1006 receives additional information, such as from an additional info section 1020 of a right-side frame, described below. The field 1008 receives an identifier of a node (e.g., a component of the computer network with which to associate the alert). The field 1010 receives a type (e.g., a component type of the node). The field 1012 receives a resource (e.g., an attribute of the node). The field 1014 receives a metric name indicative of a metric measured for generating the alert (e.g., memory usage). The field 1016 receives a severity indicating a degree to which the alert affects the resource of the node.

The graphical user interface 1000 further includes a right-side frame including a search field 1018, an additional info section 1020, an expression section 1022, and a raw info section 1024. The search field 1018, additional info section 1020, and raw info section 1024 can respectively be, for example, the same as the search field 906, the additional info section 908, and the raw info section 910 shown in FIG. 9. The expression section 1022 includes regexes used for the alert definition.

Figure 11:
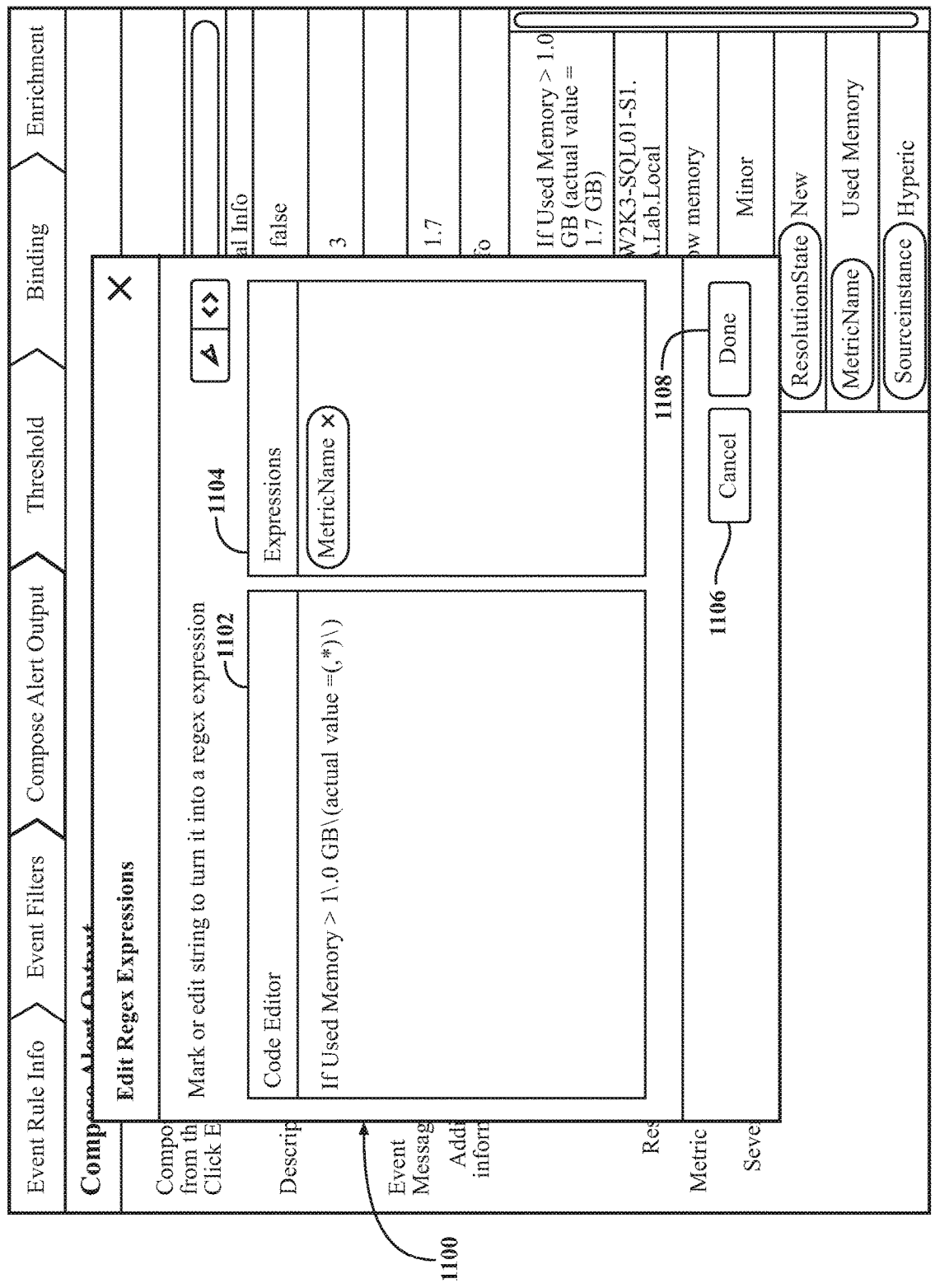
FIG. 11 is an illustration of an example graphical user interface of software for defining a regular expression used for an alert definition.

FIG. 11 is an illustration of an example user interface element 1100 of software for defining a regex used for an alert definition. For example, the user interface element 1100 can be a pop-up window displayed on top of the graphical user interface 1000 shown in FIG. 10. The user interface element 1100 includes a code editor section 1102, an expressions section 1104, a cancel user interface element 1106, and a done user interface element 1108. The code editor section 1102 can be used to write a regex for the alert definition. The expressions section 1104 list regexes that have been written for the alert definition. The cancel user interface element 1106 can be used to exit the user interface element 1100 without adding, removing, or otherwise changing regexes previously available for the alert definition. The done user interface element 1108 can be used to confirm additions, removals, or other changes to previously available regexes for the alert definition.

Figure 12:
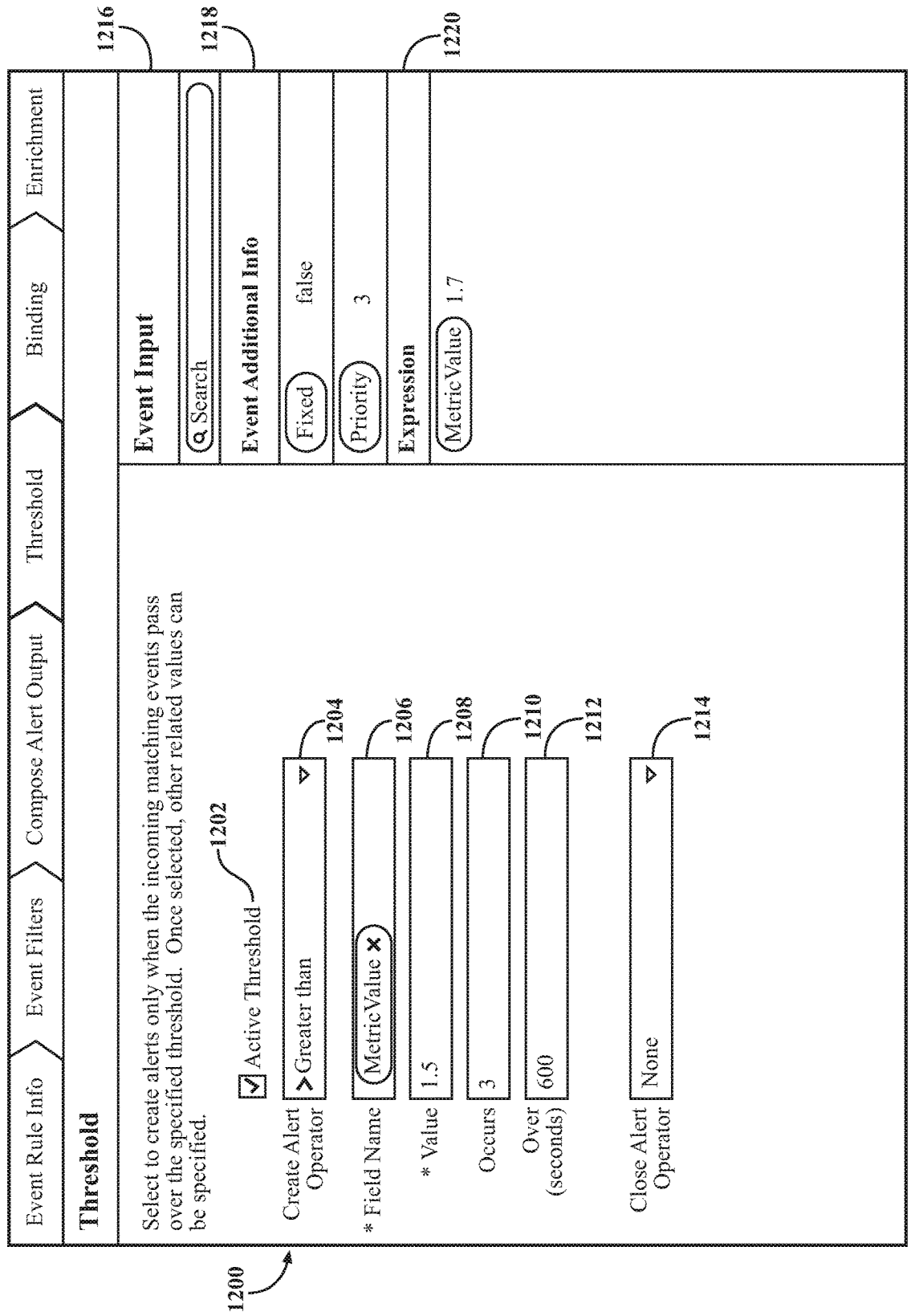
FIG. 12 is an illustration of an example graphical user interface of software for receiving an alert threshold.

FIG. 12 is an illustration of an example graphical user interface 1200 of software for receiving an alert threshold. For example, the graphical user interface 1200 can be the fourth graphical user interface described at 712 in FIG. 7. The graphical user interface 1200 includes a checkbox 1202 and fields 1204, 1206, 1208, 1210, 1212, and 1214. The checkbox can be selected to indicate that an alert threshold defined using the graphical user interface 1200 is active (e.g., enabled for use with the event rule). The field 1204 receives an operator for the alert threshold, such as for comparing to a value (e.g., greater than, less than, equal to, or the like). The field 1206 receives a characteristic of the event to use for the alert threshold. The field 1208 receives a value for the alert threshold to use for the characteristic. The field 1210 receives a number of occurrences for the value to be reached before the alert threshold is met. The field 1212 receives a time interval over which the number of occurrences must be reached before the alert threshold is met. The field 1214 receives another operator for closing the alert threshold.

The graphical user interface 1200 further includes a right-side frame including a search field 1216, an additional info section 1218, and an expression section 1220. The search field 1216, the additional info section 1218, and the expression section 1220 can respectively be, for example, the same as the search field 1018, the additional info section 1020, and the expression section 1022 shown in FIG. 10.

Figure 13A:
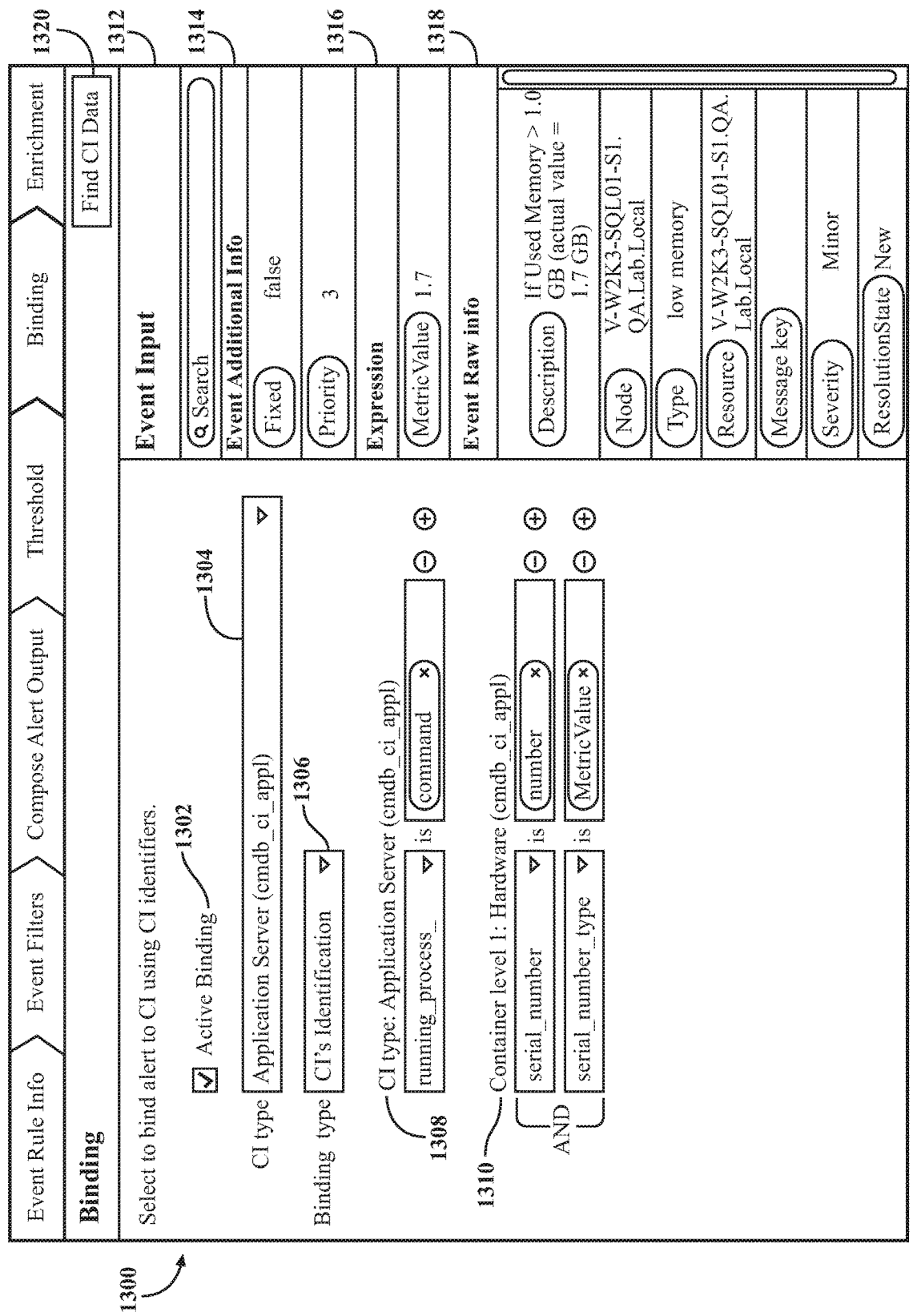
FIG. 13A is an illustration of an example graphical user interface of software for receiving a configuration item type and attribute for binding an alert.

FIG. 13A is an illustration of an example graphical user interface 1300 of software for receiving a CI type and attribute for binding an alert. For example, the graphical user interface 1300 can be the fifth graphical user interface described at 716 in FIG. 7. The graphical user interface 1300 includes a checkbox 1302, and fields 1304, 1306, 1308, and 1310. The checkbox 1302 can be selected to indicate that a CI binding defined using the graphical user interface 1300 is active (e.g., enabled for use with the event rule). The field 1304 receives a CI type. The field 1306 receives a binding type (e.g., indicating to associate an identifier of the CI with the alert). The field 1308 indicates a CI attribute of the CI type received at the field 1304. The field 1310 indicates a second CI type that is related to the CI type received at the field 1304 (e.g., where the second CI type is a child of the parent CI type received at the field 1304). The field 1310 can include multiple fields, such as for indicating a second CI type and CI attributes of the second CI type.

Figure 13B:
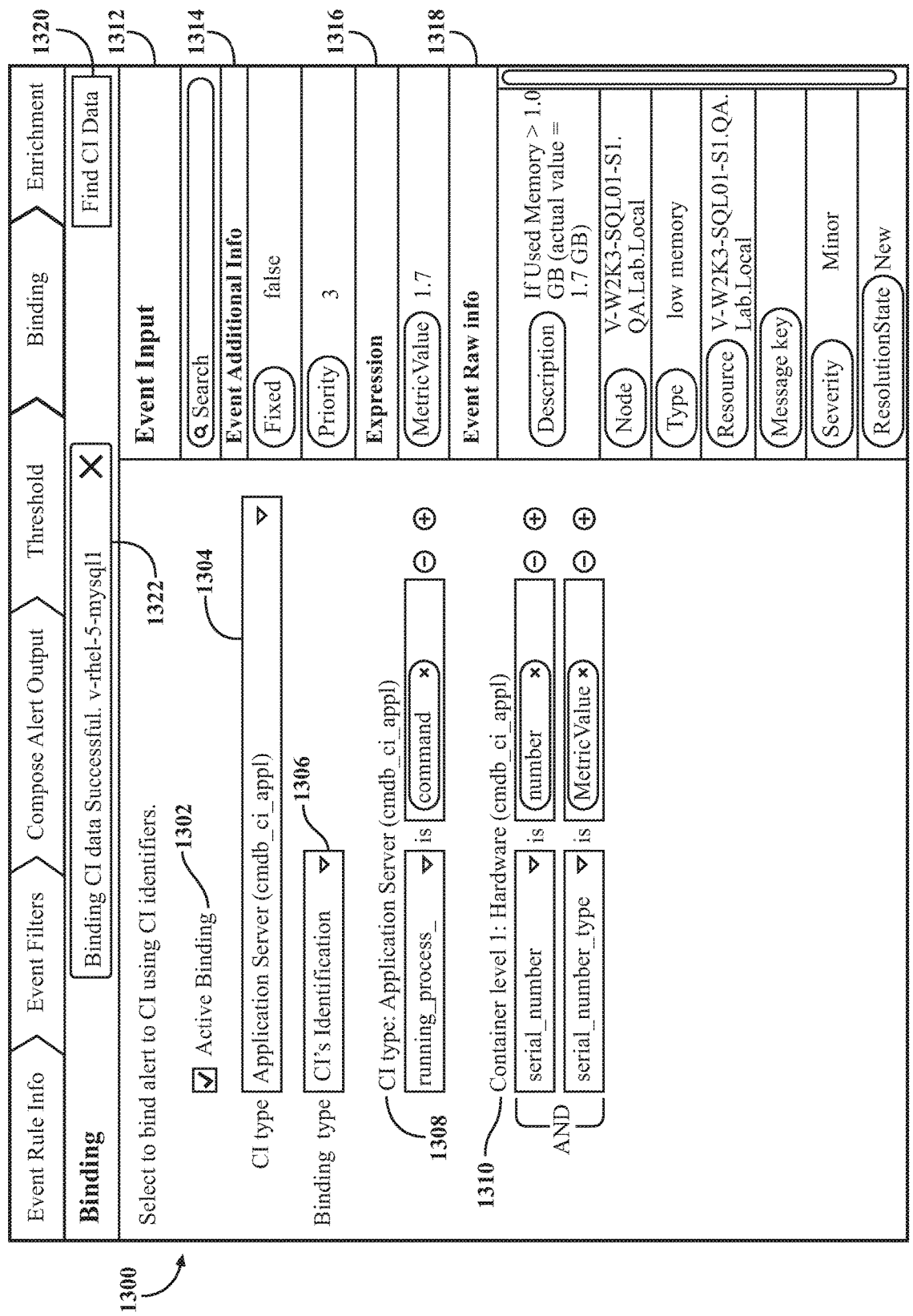
FIG. 13B is an illustration of the graphical user interface of FIG. 13A including a user interface element for verifying that an alert has been bound to a configuration item.

The graphical user interface 1300 further includes a right-side frame including a search field 1312, an additional info section 1314, an expression section 1316, and a raw info section 1318. The search field 1312, the additional info section 1314, and the expression section 1316 can respectively be, for example, the same as the search field 1216, the additional info section 1218, and the expression section 1220 shown in FIG. 12. The raw info section 1318 can be, for example, the same as the raw info section 1024 shown in FIG. 10. The graphical user interface further includes a find CI data user interface element 1320. A user can interact with the find CI data user interface element 1320, for example, to verify that a CI within a CMDB of the computer network matches the CI type and CI attribute received in the applicable fields of the graphical user interface 1300. FIG. 13B is an illustration of the graphical user interface 1300 of FIG. 13A including a user interface element 1322 for verifying that an alert has been bound to a CI. For example, responsive to verifying that the CI exists using the find CI data user interface element 1320, the event rule can include information for binding alerts generated using the event rule to that CI.

FIG. 14 is an illustration of an example graphical user interface 1400 of software for receiving alert enrichment criteria. For example, the graphical user interface 1400 can be the sixth graphical user interface described at 720 in FIG. 7. The graphical user interface 1400 includes a checkbox 1402, and fields 1404, 1406, 1408, 1410, 1412, 1414, 1416, 1418, and 1420. The checkbox 1402 can be selected to indicate that alert enrichment criteria defined using the graphical user interface 1400 is active (e.g., enabled for use with the event rule). The fields 1404, 1406, 1408, 1410, 1412, 1414, 1416, 1418, and 1420 can reflect the same or updated user input as was respectively received, for example, in the fields 1002, 1004, 1006, 1008, 1010, 1012, 1014, and 1016 shown in FIG. 10. The field 1420 can receive additional criteria to be added to the alert to enrich the alert. The graphical user interface 1400 can further include a right-side frame including a search field 1422 and a CI attribute section 1424. The search field 1422 can search a CMDB for information about CIs usable to enrich the alert. The CI attribute section 1424 includes attributes of the CI to which an alert generated using the event rule will be bound (e.g., as identified using the user input received in the graphical user interface 1300 shown in FIGS. 13A and 13B).

FIG. 15 is an illustration of an example graphical user interface 1500 of software for selecting a test event for testing an event rule. The graphical user interface 1500 includes a table listing test events usable to test the event rule built using the graphical user interfaces 800, 900, 1000, 1100, 1200, 1300, and 1400 of FIGS. 8-14. The table includes columns 1502, 1504, 1506, 1508, 1510, 1512, and 1514 for data associated with the test events. The column 1502 includes times at which test events were received. The column 1504 includes event sources from which the test events were received. The column 1506 includes descriptions of the test events. The column 1508 includes nodes associated with the test events. The column 1510 includes event types. The column 1512 includes resources of the nodes shown in the column 1508. The column 1514 includes message keys associated with the test events. The graphical user interface 1500 further includes user interface elements 1516 and 1518, respectively for canceling the test of the event rule or for navigating to a next page of test events.

Figure 16:
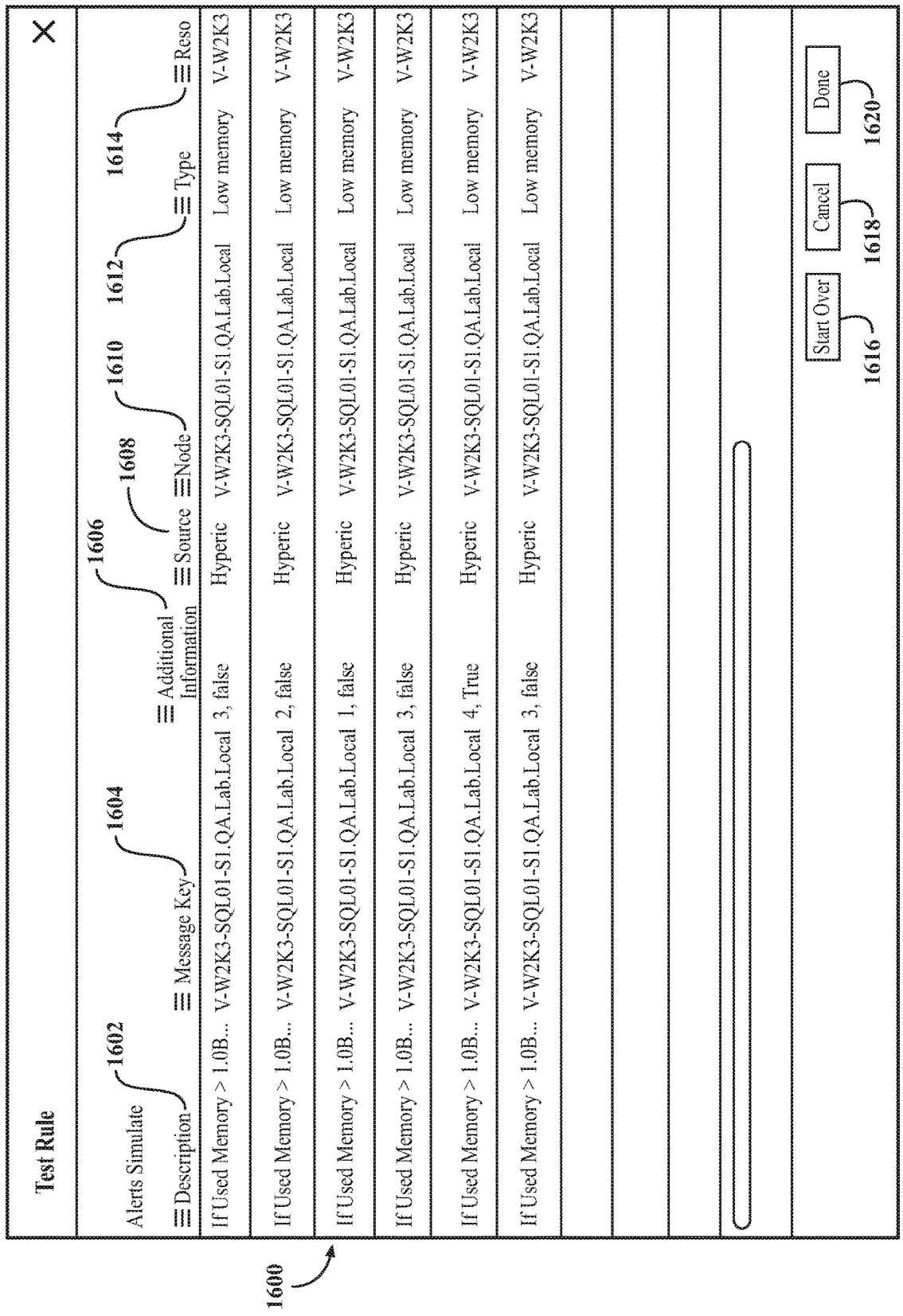
FIG. 16 is an illustration of an example graphical user interface of software including simulated alert data generated responsive to a test of an event rule.

FIG. 16 is an illustration of an example graphical user interface 1600 of software including simulated alert data generated responsive to a test of an event rule. The graphical user interface 1600 includes a table listing alerts generated responsive to tests of the event rule by applying the event rule to the test events (e.g., the test events described above with respect to FIG. 15). The table includes columns 1602, 1604, 1606, 1608, 1610, 1612, and 1614. The column 1602 includes descriptions of the alerts. The column 1604 includes message keys associated with the alerts. The column 1606 includes additional information for the alerts (e.g., based on the fields included in the field 1006 shown in FIG. 10 and/or the field 1408 shown in FIG. 14). The column 1608 includes event sources from which the test events used to generate the alerts were received. The column 1610 includes nodes affected by the alerts. The column 1612 includes types of the alerts. The column 1614 includes resources of the nodes that are affected by the alerts. The graphical user interface 1600 further includes user interface elements 1616, 1618, and 1620, respectively for initiating a retest of the event rule (e.g., by returning to the graphical user interface 1500 shown in FIG. 15 for selecting test events), canceling the test of the event rule, or completing the test process.

An implementation includes means for receiving an event from an event source; means for determining that the event is associated with an event rule based on criteria of the event rule; means for generating an alert responsive to the event meeting an alert threshold of the event rule; means for binding the alert to a configuration item identified using at least one configuration item type and at least one configuration item attribute included in the event rule; and means for enriching the alert by adding one or more attributes of the configuration item to the alert according to enrichment criteria included in the event rule.

An implementation includes means for sequentially receiving user input to build an event rule, the user input including any of criteria of the event rule, an alert threshold, an alert definition, a configuration item type, a configuration item attribute, or enrichment criteria; means for testing the event rule by applying the event rule to a plurality of test events; and means for publishing the event rule.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for processing one or more events, the system comprising:
    a memory; and
    a processor,
    wherein the memory includes instructions executable by the processor to:
        receive an event from an event source in a network;
        determine that the event is associated with an event rule based on criteria of the event rule, wherein the event rule comprises an alert threshold and an alert definition; and
        in response to the event satisfying the alert threshold associated with the event rule:
            generate an alert based on the alert definition, wherein an output of the alert comprises one or more types of information associated with resolving an issue associated with the alert, wherein the alert definition comprises one or more regular expressions (regexes) that indicate the one or more types of information included in the output of the alert;
            bind the alert to a configuration item identified in a configuration management database (CMDB) based on at least one configuration item type and at least one configuration item attribute included in the event rule, wherein the configuration item is a record in the CMDB that represents an application or a device in the network; and
            update the alert by adding one or more attributes of the configuration item associated with resolving the alert to the output of the alert according to enrichment criteria included in the event rule.

2. The system of claim 1, wherein the event source is a first event source, the event is a first event, the event rule is a first event rule, and the alert is a first alert, and wherein the memory includes instructions executable by the processor to:
receive a second event from a second event source;
determine that the second event is associated with the criteria of the first event rule;
determine that the second event does not satisfy the alert threshold of the first event rule;
determine that the second event is associated with a second event rule based on second criteria of the second event rule responsive to the determination that the second event does not meet the alert threshold of the first event rule; and
generate a second alert responsive to the event meeting a second alert threshold of the second event rule.

3. The system of claim 1, wherein the memory includes instructions executable by the processor to:
sequentially receive user input to build the event rule, wherein the user input includes the criteria of the event rule, the alert threshold, the alert definition, the at least one configuration item type, the at least one configuration item attribute, and the enrichment criteria;
test the event rule by applying the event rule to a plurality of test events; and
publish the event rule.

4. The system of claim 3, wherein sequentially receiving the user input to build the event rule comprises:
generating a plurality of graphical user interfaces configured to receive the user input, wherein the plurality of graphical user interfaces are sequentially displayed by a client device in a display order such that a first graphical user interface of the plurality of graphical user interfaces that receives the enrichment criteria is displayed after a second graphical user interface of the plurality of graphical user interfaces that receives the configuration item type.

5. The system of claim 4, wherein sequentially receiving the user input to build the event rule comprises:
sequentially transmitting the plurality of graphical user interfaces to the client device.

6. The system of claim 1, wherein a first configuration item type of the at least one configuration item type has a parent-child relationship with a second configuration item type of the at least one configuration item type, wherein a first configuration item attribute of the at least one configuration item attribute is associated with the second configuration item type.

7. The system of claim 1, wherein the alert includes at least one event attribute according to the alert definition of the event rule, and wherein the criteria of the event rule includes a function of the at least one event attribute.

8. The system of claim 1, wherein the one or more types of information represented by the one or more regexes comprise a description of the alert, or a component of the network associated with the alert, or both.

9. A method for processing one or more events, the method comprising:
receiving an event from an event source in a network;
determining that the event is associated with an event rule based on criteria of the event rule, wherein the event rule comprises an alert threshold and an alert definition; and
in response to the event satisfying the alert threshold associated with the event rule:
generating an alert based on alert definition, wherein an output of the alert comprises information associated with resolving an issue associated with the alert, including one or more attributes of the event;
binding the alert to a configuration item identified in a configuration management database (CMDB) based on at least one configuration item type and at least one configuration item attribute included in the event rule, wherein the configuration item is a record in the CMDB that represents an application or a device in the network; and
updating the alert by adding one or more attributes of the configuration item associated with resolving the alert to the output of the alert according to enrichment criteria included in the event rule, wherein the one or more attributes comprise an identifier of the configuration item, or an internet protocol (IP) address associated with the application or the device represented by the configuration item, or both.

10. The method of claim 9, wherein the event source is a first event source, the event is a first event, the event rule is a first event rule, and the alert is a first alert, and wherein the method comprises:
receiving a second event from a second event source;
determining that the second event is associated with the criteria of the first event rule;
determining that the second event does not satisfy the alert threshold of the first event rule;
determining that the second event is associated with a second event rule based on second criteria of the second event rule responsive to the determining that the second event does not meet the alert threshold of the first event rule; and
generating a second alert responsive to the event meeting the alert threshold of the second event rule.

11. The method of claim 9, the method comprising:
sequentially receiving user input to build the event rule, wherein the user input includes the criteria of the event rule, the alert threshold, the alert definition, the at least one configuration item type, the at least one configuration item attribute, and the enrichment criteria;
testing the event rule by applying the event rule to a plurality of test events; and
publishing the event rule.

12. The method of claim 11, wherein sequentially receiving the user input to build the event rule comprises:
generating a plurality of graphical user interfaces configured to receive the user input, wherein the plurality of graphical user interfaces are sequentially displayed by a client device in a display order such that a first graphical user interface of the plurality of graphical user interfaces that receives the enrichment criteria is displayed after a second graphical user interface of the plurality of graphical user interfaces that receives the configuration item type.

13. The method of claim 12, wherein sequentially receiving the user input to build the event rule comprises:
sequentially transmitting the plurality of graphical user interfaces to the client device.

14. The method of claim 9, wherein a first configuration item attribute of the at least one configuration item attribute is associated with the configuration item type.

15. The method of claim 9, wherein a first configuration item type of the at least one configuration item type has a parent-child relationship with a second configuration item type of the at least one configuration item type, wherein a first configuration item attribute of the at least one configuration item attribute is associated with the second configuration item type.

16. The method of claim 9, wherein the criteria of the event rule includes respective functions of the one or more attributes of the event.

17. A non-transitory computer-readable storage medium comprising processor-executable routines that, when executed by a processor, facilitate a performance of operations comprising:
- sequentially receiving user input to build an event rule, the user input including criteria of the event rule, an alert threshold, an alert definition, a configuration item type, a configuration item attribute, enrichment criteria, or any combination thereof;
- testing the event rule by applying the event rule to a plurality of test events;
- publishing the event rule;
- receiving an event from an event source in a network;
- determining that the event is associated with the event rule based on the criteria of the event rule; and
- in response to the event satisfying the alert threshold associated with the event rule:
  - generating an alert based on the alert definition, wherein an output of the alert comprises information associated with resolving an issue associated with the alert;
  - binding the alert to a configuration item identified in a configuration management database (CMDB) based on the configuration item type and the configuration item attribute included in the event rule, wherein the configuration item is a record in the CMDB that represents an application or a device in the network; and
  - updating the alert by adding one or more attributes of the configuration item associated with resolving the alert to the output of the alert according to the enrichment criteria included in the event rule.

18. The non-transitory computer-readable storage medium of claim 17, wherein the event rule is associated with management software, and wherein the testing omits changes to data associated with the management software.

19. The non-transitory computer-readable storage medium of claim 17, wherein sequentially receiving the user input to build the event rule comprises:
- generating a plurality of graphical user interfaces configured to receive the user input, wherein the plurality of graphical user interfaces are sequentially displayed by a client device in a display order such that a first graphical user interface of the plurality of graphical user interfaces that receives the enrichment criteria is displayed after a second graphical user interface of the plurality of graphical user interfaces that receives the configuration item type.

20. The non-transitory computer-readable storage medium of claim 19, wherein sequentially receiving the user input to build the event rule comprises:
- sequentially transmitting the plurality of graphical user interfaces to the client device.

* * * * *